United States Patent
Choi et al.

(10) Patent No.: US 11,284,478 B2
(45) Date of Patent: Mar. 22, 2022

(54) ELECTRONIC DEVICE FOR TRANSMITTING DATA ACCORDING TO COMMUNICATION SCHEME SELECTED ON BASIS OF SIGNAL STRENGTH FROM MULTIPLE COMMUNICATION SCHEMES AND METHOD FOR OPERATING SAME

(71) Applicant: Samsung Electronics Co., Ltd., Gyeonggi-do (KR)

(72) Inventors: Sehwan Choi, Gyeonggi-do (KR); Hyoseok Na, Gyeonggi-do (KR); Jungsik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/975,176

(22) PCT Filed: Jan. 16, 2019

(86) PCT No.: PCT/KR2019/000623
§ 371 (c)(1),
(2) Date: Aug. 24, 2020

(87) PCT Pub. No.: WO2019/164129
PCT Pub. Date: Aug. 29, 2019

(65) Prior Publication Data
US 2021/0120629 A1 Apr. 22, 2021

(30) Foreign Application Priority Data
Feb. 26, 2018 (KR) .................. 10-2018-0022821

(51) Int. Cl.
*H04W 4/00* (2018.01)
*H04W 88/06* (2009.01)
(Continued)

(52) U.S. Cl.
CPC .......... *H04W 88/06* (2013.01); *H04B 7/0617* (2013.01); *H04B 17/318* (2015.01); *H04W 4/024* (2018.02); *H04W 72/0453* (2013.01)

(58) Field of Classification Search
CPC . H04W 88/06; H04W 4/024; H04W 72/0453; H04W 17/318; H04W 7/0617
(Continued)

(56) References Cited

U.S. PATENT DOCUMENTS 9,526,076 B1 * 12/2016 Park ...................... H02J 7/0027
2006/0068849 A1   3/2006 Bernhard et al.
(Continued)

FOREIGN PATENT DOCUMENTS

KR  10-2005-0022675 A   3/2005
KR  10-2015-0107806 A   9/2015
(Continued)

*Primary Examiner* — Huy C Ho
(74) *Attorney, Agent, or Firm* — Cha & Reiter, LLC.

(57) ABSTRACT

According to various embodiments, an electronic device may comprise a first communication module, a second communication module, and a processor. The processor may check the strength of a signal received from an external electronic device by using the communication module or the second communication module. If the strength satisfies a first designated condition, the processor may transmit first data, among data to be transmitted to the external electronic device, to the external electronic device by using a first designated frequency corresponding to the first communication module, and may transmit second data, among the data, to the external electronic device by using a second designated frequency corresponding to the second communication module. If the strength satisfies a second designated condition, the processor may check the position of the external electronic device with regard to the electronic device by using the first designated frequency, and may transmit the data to the external electronic device, at least on (Continued)

the basis of the position, by using the second designated frequency. If the strength satisfies a third designated condition, the processor may transmit the data to the external electronic device through the first communication module and the second communication module by using one corresponding designated frequency among the first designated frequency and the second designated frequency. Various other embodiments are possible.

15 Claims, 17 Drawing Sheets

(51) Int. Cl.
      *H04B 17/318*     (2015.01)
      *H04W 4/024*     (2018.01)
      *H04B 7/06*     (2006.01)
      *H04W 72/04*     (2009.01)

(58) Field of Classification Search
      USPC ........................................................ 370/329
      See application file for complete search history.

(56) References Cited

U.S. PATENT DOCUMENTS

| | | |
|---|---|---|
| 2012/0040629 A1 | 2/2012 | Li et al. |
| 2016/0027399 A1 | 1/2016 | Wilde et al. |
| 2016/0238692 A1 | 8/2016 | Hill et al. |
| 2016/0364910 A1 | 12/2016 | Higgins et al. |
| 2017/0033848 A1 | 2/2017 | Cordeiro et al. |
| 2017/0163513 A1* | 6/2017 | Kim ..................... H04B 17/318 |
| 2018/0359017 A1 | 12/2018 | Kwon et al. |
| 2019/0069303 A1* | 2/2019 | Yerramalli .......... H04W 72/082 |

FOREIGN PATENT DOCUMENTS

| | | |
|---|---|---|
| KR | 10-2016-0099193 A | 8/2016 |
| KR | 10-2017-0053302 A | 5/2017 |
| KR | 10-2017-0066115 A | 6/2017 |
| WO | 2017/086599 A1 | 5/2017 |

\* cited by examiner

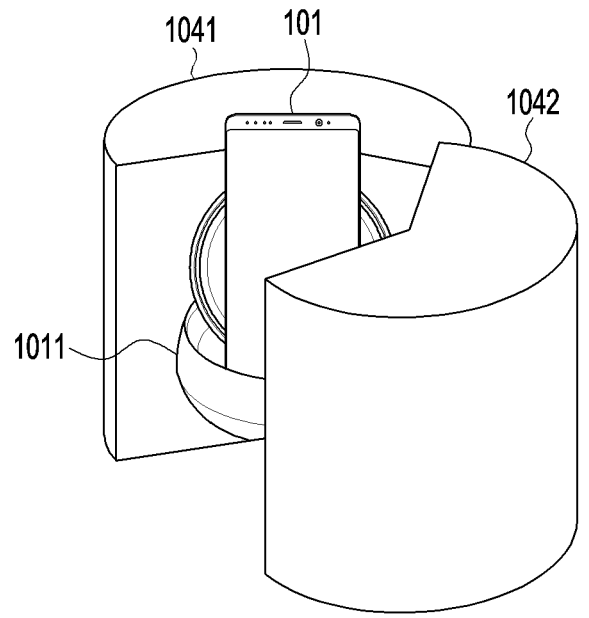
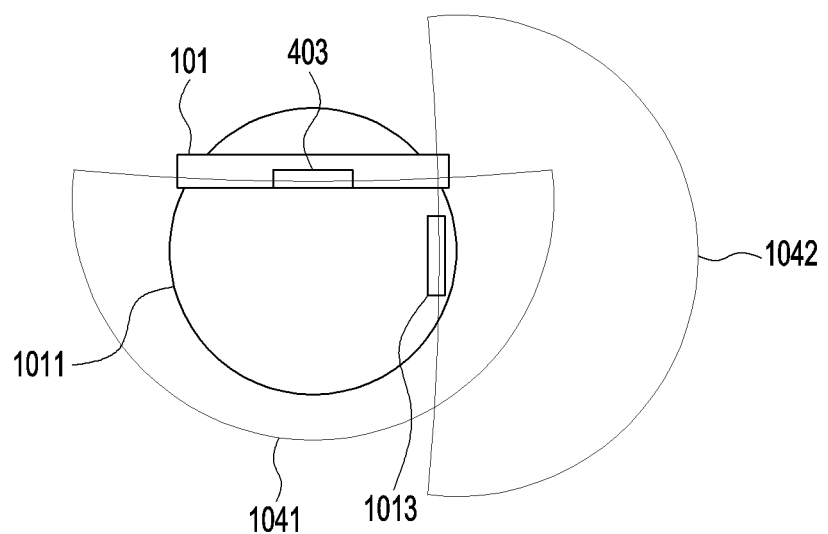
FIG.10B

ELECTRONIC DEVICE FOR TRANSMITTING DATA ACCORDING TO COMMUNICATION SCHEME SELECTED ON BASIS OF SIGNAL STRENGTH FROM MULTIPLE COMMUNICATION SCHEMES AND METHOD FOR OPERATING SAME

CROSS-REFERENCE TO RELATED APPLICATION(S)

This application is a National Phase Entry of PCT International Application No. PCT/KR2019/000623 which was filed on Jan. 16, 2019, and claims priority to Korean Patent Application No. 10-2018-0022821, which was filed on Feb. 26, 2018, the contents of which are incorporated herein by reference.

BACKGROUND

1. Field

The disclosure generally relates to an electronic device for performing data communication with an external electronic device, and an operation method therefor.

2. Description of the Related Art

A mobile communication service begun with a voice communication service, and has evolved to provide a super-high speed and large capacity service (e.g., a high-quality video streaming service), and a next generation mobile communication service which is to be commercialized, including WiGig or the like, is expected to be provided via a super-high frequency band greater than tens of GHz. As communication standards such as a short-range wireless communication, Bluetooth, and the like have been actively utilized, electronic devices, such as, mobile communication terminals, have come to be equipped with antenna devices that operate in various different frequency bands. For example, a 4G mobile communication service operates in frequency bands of 700 MHz, 1.8 GHz, 2.1 GHz, and the like. Wi-Fi operates in frequency bands of 2.4 GHz and 5 GHz, which may be slightly different depending on the standard. Bluetooth operates in a frequency band of 2.45 GHz.

In order to meet wireless data traffic demands, which are increasing after the commercialization of a $4^{th}$-Generation (4G) communication system, efforts to develop a next generation communication system, for example, a $5^{th}$-Generation (5G) communication system or a pre-5G communication system, are being made. For this reason, the 5G communication system or the pre-5G communication system is called a beyond-4G-network communication system or a post-long term evolution (post LTE) system.

In order to provide a service with reliable quality in a commercialized wireless communication network, an antenna device needs to satisfy a high gain and a wide beam coverage area. A next generation mobile communication service may be provided via a super-high frequency band (hereinafter, a millimeter wave (mmWave) band) of more than tens of GHz (e.g., a frequency band in the range of approximately 10 to 300 GHz, and the length of a resonant frequency wavelength is in the range of approximately 1 to 30 mm). For example, the Institute of Electrical and Electronics Engineers (IEEE) 802.11ad (WiGig) standard is considering a wireless communication system that provides a service in a super-high frequency band (e.g., a super-high frequency band of approximately 60 GHz) and uses beam-forming technology. In addition, in order to achieve a high data transmission rate, it is considered to implement the 5G communication system in a super-high frequency band (e.g., a band of tens of GHz, for example, approximately 60 GHz or the like), such as millimeter waves (mmWave). In order to decrease the path loss of electromagnetic waves and increase the travel distance of electromagnetic waves in a super-high frequency band, usage of beamforming, massive multi-input multi-output (massive MIMO), full dimensional MIMO (FD-MIMO), array antenna, analog beam-forming, and large scale antenna technologies in the IEEE 802.11ad standard technology or the 5G communication system are being discussed.

Also, in order to improve the network of a system, technologies, such as an enhanced small cell, an advanced small cell, a cloud radio access network (cloud RAN), a ultra-dense network, device to device (D2D) communication, a wireless backhaul, a moving network, cooperative communication, coordinated multi-points (CoMP), and interference cancellation, and the like, are being developed in association with the 5G communication system.

In addition, hybrid frequency shift keying (FSK) and quadrature amplitude modulation (QAM) (FQAM) and sliding window superposition coding (SWSC), which are advanced coding modulation (ACM) schemes, and filter band multi-carrier (FBMC), non-orthogonal multiple access (NOMA), sparse code multiple access (SCMA), and the like, which are advanced access technologies, are being developed in association with the 5G system.

SUMMARY

If an electronic device performs communication with an external electronic device using only a single frequency band or only a single frequency channel via a single communication module, the electronic device may be unreliably connected to the external electronic device due to the path loss of electromagnetic waves. For example, if the electronic device performs communication with the external electronic device using only the single communication module, the electronic device may be unreliably connected to the external electronic device due to the limit of beam coverage output from the single communication module. In addition, development of technology capable of dynamically setting the operation mode of a communication module according to a communication environment may be requested.

Various embodiments may provide an electronic device that performs communication with an external electronic device using at least two communication modules or at least two frequency channels, and reliably performs data transmission or reception with the external electronic device, and an operation method therefor. The electronic device and the operation method therefor may dynamically set the operation modes of at least two communication modules according to a communication environment.

According to various embodiments, an electronic device may include a first communication module, a second communication module, and a processor, wherein the processor is configured to: identify the strength of a signal received from an external electronic device using the first communication module or the second communication module; if the strength satisfies a first designated condition, transmit first data among data, which are to be transmitted to the external electronic device, to the external electronic device using a first designated frequency corresponding to the first communication module, and transmit second data among the data to the external electronic device using a second designated frequency corresponding to the second communication module; if the strength satisfies a second designated condition, identify the position of the external electronic device in comparison with the electronic device, using the first designated frequency, and transmit the data to the external electronic device based at least on the position using the second designated frequency; and if the strength satisfies a third designated condition, transmit the data to the external electronic device via the first communication module and the second communication module, using a designated frequency corresponding to one of the first designated frequency and the second designated frequency.

According to various embodiments, the operation method of the electronic device that performs data communication may include: identifying the strength of a signal received from an external electronic device using a first communication module or a second communication module; if the strength satisfies a first designated condition, transmitting first data among data, which are to be transmitted to the external electronic device, to the external electronic device using a first designated frequency corresponding to the first communication module, and transmitting second data among the data to the external electronic device using a second designated frequency corresponding to the second communication module; if the strength satisfies a second designated condition, identifying the position of the external electronic device in comparison with the electronic device using the first designated frequency, and transmitting the data to the external electronic device based at least on the position using the second designated frequency; and if the strength satisfies a third designated condition, transmitting the data to the external electronic device via the first communication module and the second communication module using a designated frequency corresponding to one of the first designated frequency and the second designated frequency.

According to various embodiments, an electronic device may include a first communication module capable of performing communication according to a designated scheme, an interface circuit, and a processor, wherein the processor is configured to: in the state of being connected, via the interface circuit, to a first external electronic device including a second communication module capable of performing communication according to the designated scheme, identify the strength of a signal received from a second external electronic device using the first communication module or the second communication module; if the strength satisfies a first designated condition, transmit first data among data, which are to be transmitted to the second external electronic device, to the second external electronic device using a first designated frequency corresponding to the first communication module, and transmit second data among the data to the second external electronic device using a second designated frequency corresponding to the second communication module; if the strength satisfies the second designated condition, identify the position of the second external electronic device in comparison with the electronic device using one of the first designated frequency or the second designated frequency, and transmit the data to the second external electronic device based at least on the position using the remaining one of the first designated frequency and the second designated frequency and if the strength satisfies a third designated condition, transmit the data to the second external electronic device via the first communication module and the second communication module using a designated frequency corresponding to one of the first designated frequency and the second designated frequency.

According to various embodiments, an electronic device may include: a communication module configured to communicate with an external electronic device using a first designated channel and a second designated channel; and a processor, wherein the processor is configured to: identify the strength of a signal received from the external electronic device using the first designated channel or the second designated channel; if the strength satisfies a first designated condition, transmit first data among data, which are to be transmitted to the external electronic device, to the external electronic device using the first designated channel, and transmit second data among the data to the external electronic device using the second designated channel; and if the strength satisfies a second designated condition, identify the position of the external electronic device in comparison with the electronic device, using the first designated channel, and transmit the data to the external electronic device based at least on the position using the second designated channel.

According to various embodiments, there may be provided an electronic device that identifies the strength of a signal received from an external electronic device, and changes a data communication environment according to the state of the received signal, and an operation method therefor. Accordingly, the electronic device can perform reliable data communication with an external electronic device that requires high-resolution and low-delay communication. Alternatively, the electronic device performs data communication with an external electronic device using a communication module of the electronic device and a communication module of an intermediate device connected to the electronic device, and thus may have a beam coverage area wider than the area that a single communication module can cover.

BRIEF DESCRIPTION OF THE DRAWINGS

FIG. 10B is a diagram illustrating a beam coverage area of a first communication module of an electronic device and a beam coverage area of a second communication module of a first external electronic device, according to various embodiments;

DETAILED DESCRIPTION

Figure 1:
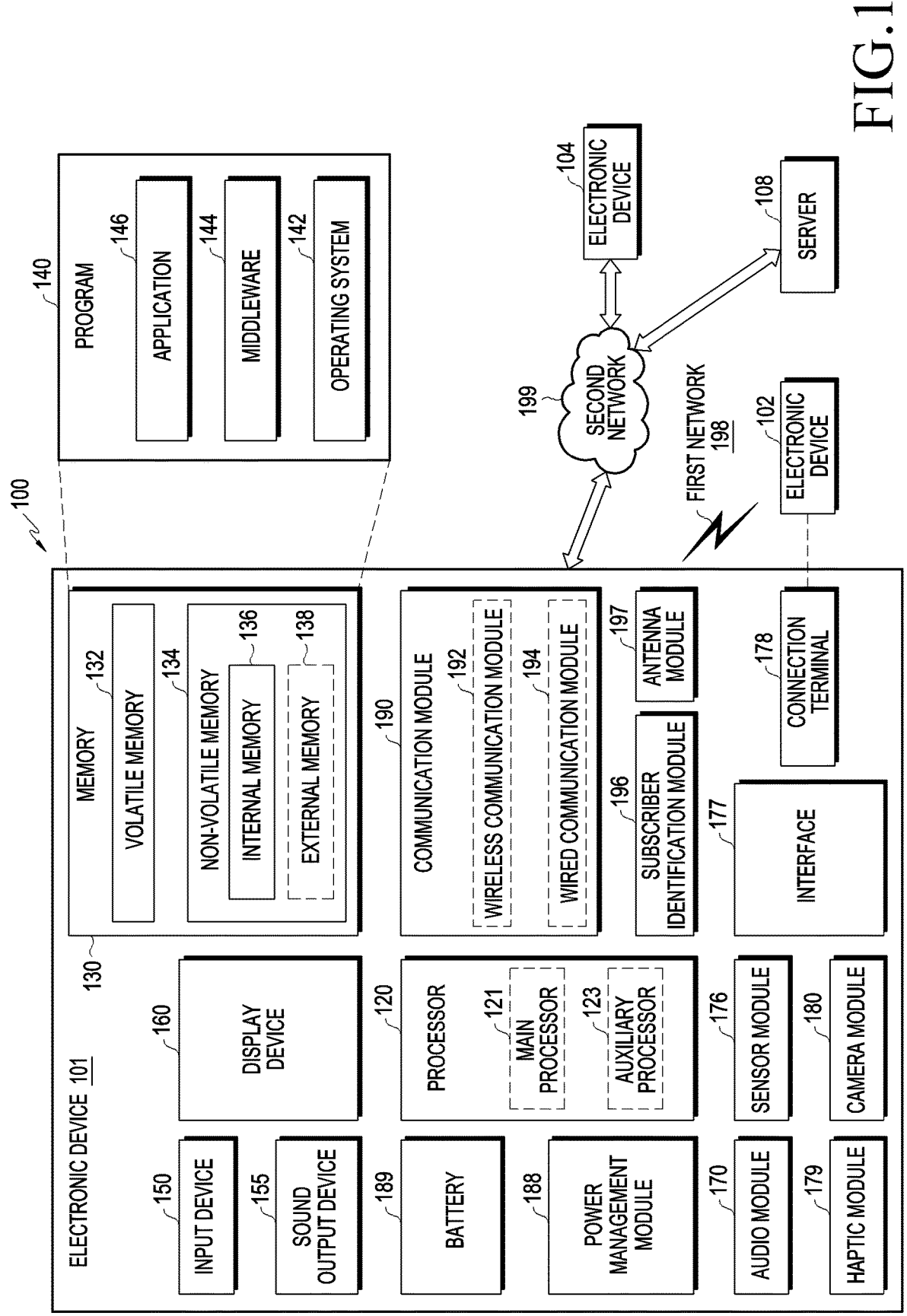
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
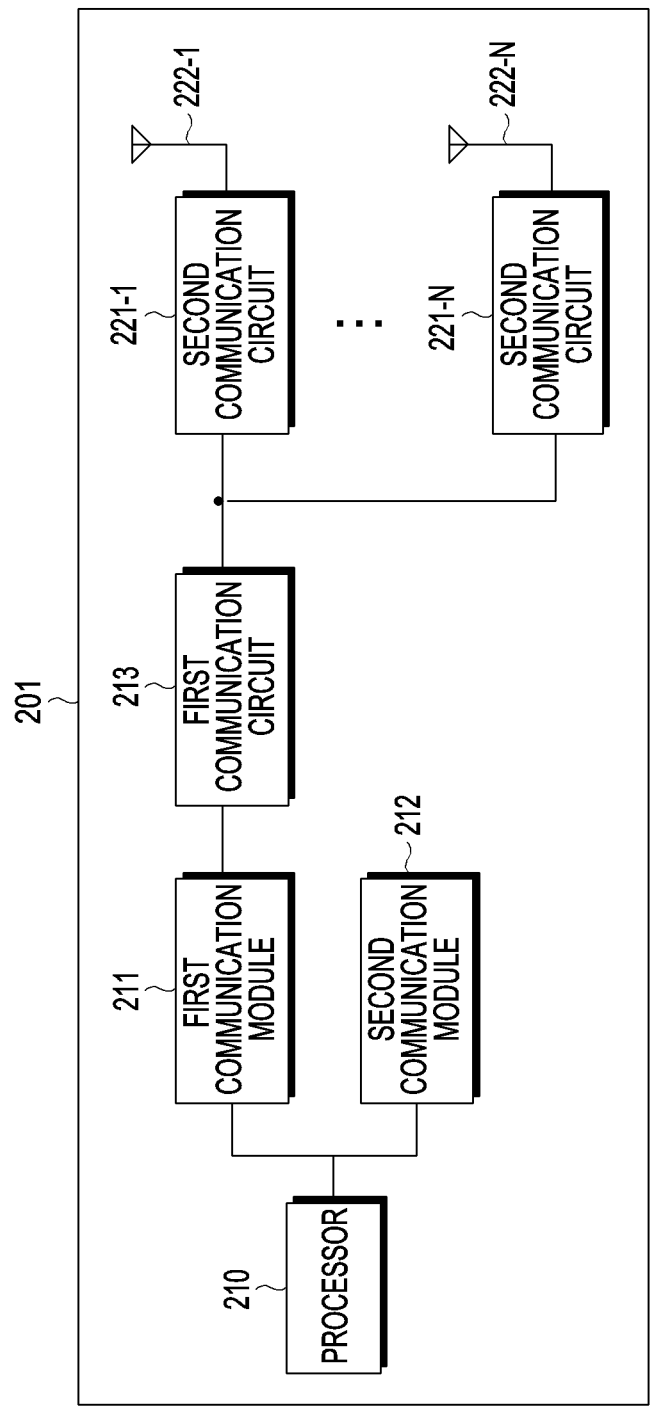
FIG. 2 is a block diagram illustrating an electronic device in order to describe the configuration of a communication module according to various embodiments in detail.

FIG. 2 is a block diagram illustrating an electronic device 201 (e.g., the electronic device 101 of FIG. 1) provided in order to describe the configuration of a communication module 211 (e.g., the communication module 190 of FIG. 1), in detail according to various embodiments. Referring to FIG. 2, the electronic device 201 according to various embodiments may include a processor 210 (e.g., the application processor (AP) 120 of FIG. 1), a first communication module 211 (e.g., the communication module 190 of FIG. 1; a communication processor (CP)), a second communication module 212 (e.g., the communication module 190 of FIG. 1), a first communication circuit 213 (e.g., a radio frequency IC (RFIC), an intermediate frequency IC (IFIC), a transceiver), second communication circuits 221-1, . . . , and 221-N, and array antennas 222-1, . . . , and 222-N. Each array antenna 222-1, . . . , and 222N may include multiple antenna elements.

According to an embodiment, the first communication circuit 213 may include a modulator or a demodulator. For example, the first communication circuit 213 may use the modulator so as to modulate a transmission signal generated in the first communication module 211 or the processor 210 into a signal in a radio frequency (RF) signal (an RF signal) or a signal in an intermediate frequency (IF) band (an IF signal). The first communication circuit 213, for example, may use the demodulator so as to demodulate an RF signal or IF signal received via the plurality of second communication circuits 221-1, . . . , and 221-N into a baseband signal. According to various embodiments, at least two first communication circuits 213 may be connected to the first communication module 211. Each of the at least two first communication circuits 213 may be controlled by the single communication module 211 so that the at least two first communication circuits 213 process millimeter waves (mmWave) of different frequency bands or the same frequency band.

According to various embodiments, each of the plurality of second communication circuits 221-1, . . . , and 221-N may receive an RF signal modulated by the first communication circuit 213, may perform amplification and/or radio signal processing on the received signal, and may transmit the same to a wireless space via the corresponding array antenna 222-1, . . . , and 222-N. According to various embodiments, the second communication circuit 221-1, . . . , and 221-N may receive an IF signal modulated by the first communication circuit 213, may convert the signal into an RF signal, may perform amplification and/or radio signal processing on the converted signal, and may transmit the same to a wireless space via the corresponding array antenna 222-1, . . . , and 222-N.

According to various embodiments, the second communication circuit 221-1, . . . , and 221-N and the each array antenna 222-1, . . . , 222-N including multiple antenna elements may be implemented as at least one module.

According to various embodiments, the second communication circuit 221-1, . . . , and 221-N and the array antenna 222-1, . . . , 222-N may be implemented as a separate device, module, or circuit. According to various embodiments, the array antenna 222-1, . . . , and 222-N manufactured in the form of a module may include an mmWave array antenna using a super-high frequency band, such as millimeter waves. The second communication module 212 according to various embodiments may include at least one third communication circuit and at least one fourth communication circuit, so as to perform the same function as that of the first communication module 211. The at least one third communication circuit may correspond to the first communication circuit 213, and may perform the function of the first communication circuit 213. The fourth communication circuit may correspond to the second communication circuit 221-1, . . . , and 221-N, and may perform the function of the second communication circuit 221-1, . . . , and 221-N. The first communication module 211 and the second communication module 212 may be controlled by the processor 211, so that the first communication module 211 and the second communication module 212 process millimeter waves (mmWave) of different frequency bands or the same frequency band.

As technology that enables an electronic device, which performs communication using a super-high frequency band, such as millimeter waves, to perform data communication, various embodiments may be applicable to various types of electronic devices. In the description of various embodiments provided below, it is illustrated that an electronic device according to various embodiments performs communication, for example, in a super-high frequency band (e.g., mmWave) for 5G communication. However, the disclosure is not limited to the specific communication scheme, and at least some embodiments may be applicable to a device that transmits wireless signals of various bands via at least two antennas.

Figure 3:
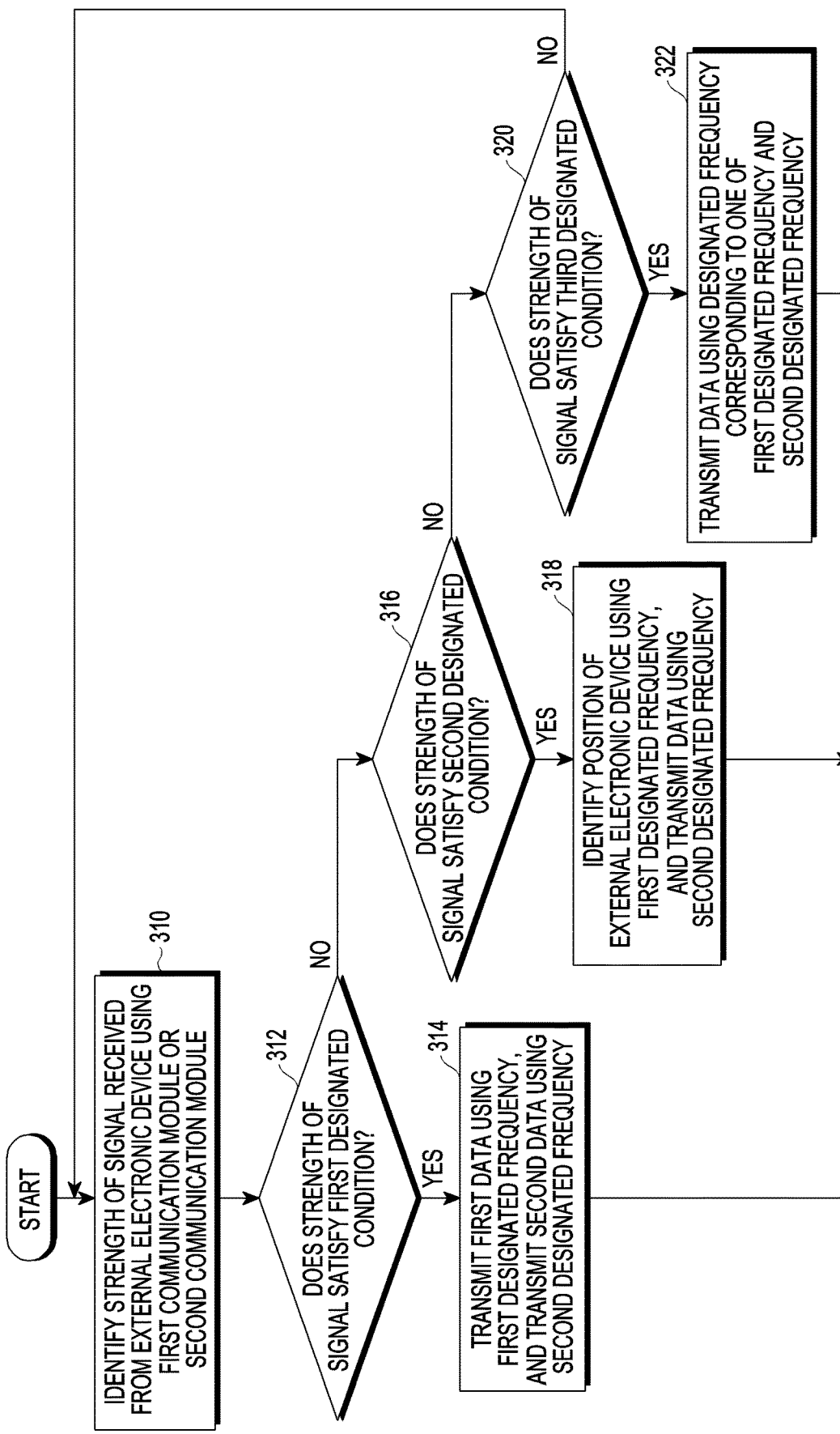
FIG. 3 is a flowchart illustrating an operation in which an electronic device changes a data communication environment according to various embodiments.
Figure 4A:
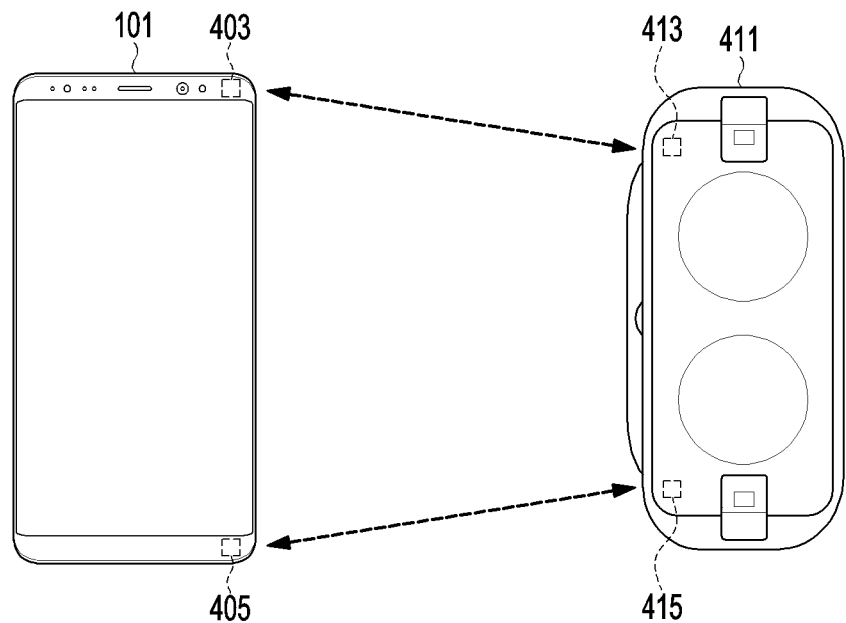
FIG. 4A is a diagram illustrating an example in which an electronic device including two communication modules transmits data to an external electronic device, according to various embodiments.
Figure 4B:
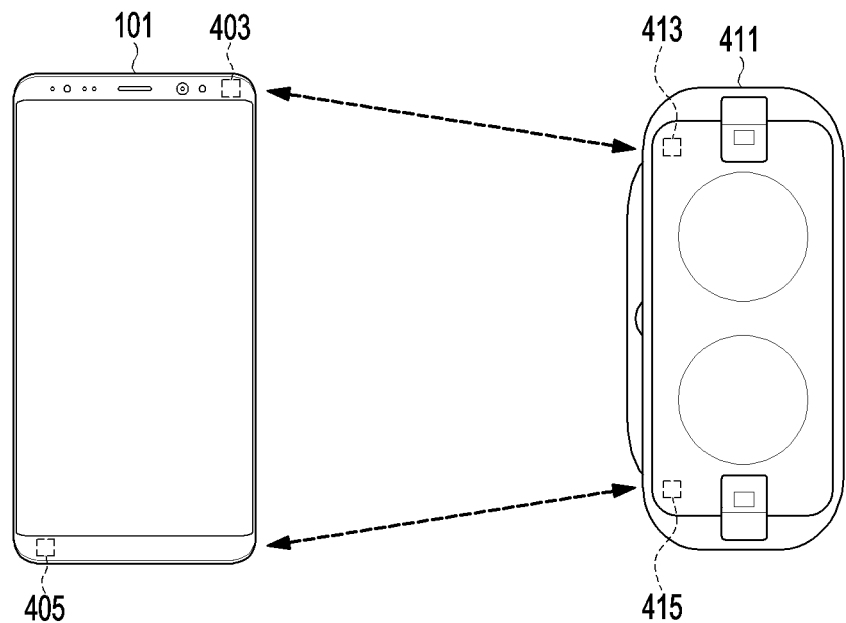
FIG. 4B is a diagram illustrating an electronic device including two communication modules which are spaced from each other according to various embodiments.

FIG. 3 is a flowchart illustrating an operation in which the electronic device 101 changes a data communication environment according to various embodiments. The embodiment of FIG. 3 will be described in detail with reference to FIGS. 4A and 4B. FIG. 4A is a diagram illustrating an example in which the electronic device 101 including two communication modules perform data communication with an external electronic device, according to various embodiments. FIG. 4B is a diagram illustrating the electronic device 101 including two communication modules which are spaced from each other according to various embodiments.

In operation 310, according to various embodiments, the electronic device 101 (e.g., the processor 120) may identify the strength of a signal (e.g., a link budget) received from an external electronic device using a first communication module 403 (e.g., the first communication module 211 of FIG. 2) or a second communication module 405 (e.g., the second communication module 212 of FIG. 2). For example, the electronic device 101 may identify the received signal strength indication (RSSI) value of a signal received from an external electronic device 411 (e.g., the electronic device 102 of FIG. 1) using the first communication module 403 or the second communication module 404.

The electronic device 101 according to various embodiments may identify the strength of a signal received from the external electronic device 411 using at least two communication modules (e.g., the first communication module 403 or the second communication module 405). For example, as illustrated in FIG. 4A, the electronic device 101 may identify the strength of a signal received from a first communication module 413 of the external electronic device 411 using the first communication module 403, and may identify the strength of a signal received from a second communication module 415 of the external electronic device 411 using the second communication module 405. According to various embodiments, the electronic device 101 may identify the strength of a signal received using any one of the first communication module 403 or the second communication module 405. The external electronic device 411 according to various embodiments may include a virtual reality (VR) device, an augmented reality (AR) device, or an electronic device equipped with a display, and is not limited to the mentioned example.

The first communication module 403 and the second communication module 405 included in the electronic device 101 according to various embodiments may be disposed to be spaced from each other, so as to maximally widen the beam coverage area of an antenna. For example, as illustrated in FIG. 4B, the first communication module 403 may be disposed in the upper right corner of the front side of the electronic device 101, and the second communication module 405 may be disposed in the lower left corner of the rear side of the electronic device 101. The locations and the number of communication modules illustrated in FIGS. 4A and 4B are merely examples, and the number of communication modules and the location at which the communication modules are disposed are not limited.

The electronic device 101 according to various embodiments may identify the transmission strength of a signal that the electronic device 101 transmits to the external electronic device 411 using the first communication module 403 or the second communication module 405. For example, the electronic device 101 may identify the transmitter signal strength indicator (TSSI) value of a transmission signal transmitted to the external electronic device 411 using the first communication module 403 or the second communication module 405. The electronic device 101, for example, may identify a link budget, based on the TSSI of a transmission signal transmitted to the external electronic device 411, the RSSI of a signal received from the external electronic device 411, the antenna gain of the external electronic device 411, the antenna gain of the electronic device 101, and the like.

In operation 312, according to various embodiments, the electronic device 101 may identify whether the strength of the signal satisfies a first designated condition. For example, as the first designated condition, if the strength of a signal received via the first communication module 403 is greater than or equal to a first designated strength, or if the strength of a signal received via the second communication module 405 is greater than or equal to a second designated strength, the electronic device 101 may identify that the first designated condition is satisfied. The first designated condition may correspond to the case in which the distance between the electronic device 101 and the external electronic device 411 is relatively short. For example, if the electronic device 101 is disposed relatively close to the external electronic device 411, the probability of losing a link due to a movement of the external electronic device 411 may be low. The first designated strength according to various embodiments may be the same as, or different from, the second designated strength. The electronic device 101 according to various embodiments may identify whether the strength of a signal received from the external electronic device 411 and the strength of another signal transmitted from the electronic device 101 to the external electronic device 411 satisfy the first designated condition. For example, as the first designated condition, if the strength of a first signal received from the external electronic device 411 via the first communication module 403 is greater than or equal to a first designated strength-1 and the transmission strength of a second signal transmitted from the electronic device 101 to the external electronic device 411 is greater than or equal to a first designated strength-2, or if the strength of a third signal received via the second communication module 405 is greater than or equal to a second designated strength-1 and the transmission strength of a fourth signal transmitted from the electronic device 101 to the external electronic device 411 is greater than or equal to a second designated strength-2, the electronic device 101 may identify that the first designated condition is satisfied.

In operation 314, according to various embodiments, if the strength of the signal received from the external electronic device 411 satisfies the first designated condition, the electronic device 101 may transmit first data among data, which are to be transmitted to the external electronic device 411, to the external electronic device 411 using a first designated frequency corresponding to the first communication module 403, and may transmit second data among the data to the external electronic device 411 using a second designated frequency corresponding to the second communication module 405. In the electronic device 101 according to various embodiments, while the first communication module 403 transmits the first data using the first designated frequency, the second communication module 405 transmits the second data to the external electronic device 411 using the second designated frequency which is the same as the first designated frequency. In the electronic device 101 according to various embodiments, while the first communication module 403 transmits the first data using the first designated frequency, the second communication module 405 transmits the second data to the external electronic device 411 using the second designated frequency which is different from the first designated frequency. If the strength of the signal satisfies the first designated condition, the electronic device 101 according to various embodiments may transmit data to the external electronic device 411 using both the first communication module 403 and the second communication module 405, and a high data transmission speed (data rate) may be implemented.

In operation 316, according to various embodiments, the electronic device 101 may identify whether the strength of the signal satisfies a second designated condition. For example, as the second designated condition, if the strength of a signal received via the first communication module 403 is less than the first designated strength, or if the strength of a signal received via the second communication module 405 is greater than or equal to the second designated strength, the electronic device 101 may identify that the second designated condition is satisfied. As the second designated condition, if the strength of a signal received via at least one of the first communication module 403 or the second communication module 405 is less than the first designated strength and is greater than or equal to the second designated strength, the electronic device 101 according to various embodiments may identify that the second designated condition is satisfied. As the second designated condition, if the strength of a signal received via one of the first communication module 403 or the second communication module 405 is less than the first designated strength, and the strength of a signal received via the other one is greater than or equal to the second designated strength, the electronic device 101 according to various embodiments may identify that the second designated condition is satisfied.

The electronic device 101 according to various embodiments may identify whether the strength of a signal received from the external electronic device 411 and the strength of another signal that is transmitted from the electronic device 1010 to the external electronic device 411 satisfy the second designated condition. For example, as the second designated condition, if the strength of a first signal received from the external electronic device 411 via the first communication module 403 is less than the first designated strength-1 and the transmission strength of a second signal transmitted to the external electronic device 411 is less than the first designated strength-2, or if the strength of a third signal received from the external electronic device 411 via the second communication module 405 is greater than or equal to the second designated strength-1 and the transmission strength of a fourth signal transmitted to the external electronic device 411 is greater than or equal to the second designated strength-2, the electronic device 101 may identify that the second designated condition is satisfied. The second designated condition may correspond to the case in which the distance between the electronic device 101 and the external electronic device 411 is farther than the first designated condition. For example, as the distance between the electronic device 101 and the external electronic device 411 becomes farther, the probability of losing a link due to a movement of the external electronic device 411 becomes higher.

In operation 318, according to various embodiments, if the strength of the signal received from the external electronic device 411 satisfies the second designated condition, the electronic device 101 may identify the position of the external electronic device 411 in comparison with the electronic device 101, using the first designated frequency, and may transmit data to the external electronic device 411 based at least on the position using the second designated frequency. The electronic device 101 according to various embodiments may identify the environment/state of an RF of the external electronic device 411 using the first designated frequency.

If the strength of the signal satisfies the second designated condition, the electronic device 101 according to various embodiments may identify the position of the external electronic device 411 in comparison with the electronic device 101, using at least one of the strength of a signal received from the external electronic device 411 or the strength of another signal transmitted from the electronic device 101 to the external electronic device 411. For example, the electronic device 101 may measure the strength (RSSI) of the signal received from the external electronic device 411 or the strength (TSSI) of the other signal transmitted to the external electronic device 411, and may identify the distance and the direction in which the external electronic device 411 is distant from the electronic device 101.

If the strength of the signal satisfies the second designated condition, the electronic device 101 according to various embodiments may transmit data to the external electronic device 411 using the second designated frequency, based at least on the position of the external electronic device 411. For example, the electronic device 101 may set phases of signals corresponding to a plurality of patch antennas so that the propagation direction of an antenna of the second communication module is oriented to the position of the external electronic device 411, and may transmit data to the external electronic device 411 using the second designated frequency corresponding to the second communication module 405. In the electronic device 101 according to various embodiments, while the first communication module 403 identifies the position of the external electronic device 411 using the first designated frequency, the second communication module 405 transmits data to the external electronic device 411 using the second designated frequency which is the same as the first designated frequency. In the electronic device 101 according to various embodiments, while the first communication module 403 identifies the position of the external electronic device 411 using the first designated frequency, the second communication module 405 transmits data to the external electronic device 411 using the second designated frequency which is different from the first designated frequency. If the strength of the signal satisfies the second designated condition, the electronic device 101 according to various embodiments identifies the position of the external electronic device 411 using the first communication module 403, and transmits data to the external electronic device 411 using the second communication module 405 based on the position, so as to support the reliable connection between the electronic device 101 and the external electronic device 411.

In operation 320, according to various embodiments, the electronic device 101 may identify whether the strength of the signal received from the external electronic device 411 satisfies a third designated condition. For example, as the third designated condition, if the strength of the signal received via the first communication module 403 is less than the first designated strength, or if the strength of the signal received via the second communication module 405 is less than the second designated strength, the electronic device 101 may identify that the third designated condition is satisfied. The electronic device 101 according to various embodiments may identify whether the strength of the signal received from the external electronic device 411 and the strength of another signal transmitted from the electronic device 101 to the external electronic device 411 satisfy the third designated condition. For example, as the third designated condition, if the strength of a first signal received from the external electronic device 411 via the first communication module 403 is less than the first designated strength-1 and the transmission strength of a second signal transmitted from the electronic device 101 to the external electronic device 411 is less than the first designated strength-2, or if the strength of a third signal received from the external electronic device 411 via the second communication module 405 is less than the second designated strength-1 and the transmission strength of a fourth signal transmitted to the external electronic device 411 is less than the second designated strength-2, the electronic device 101 may identify that the third designated condition is satisfied. The third designated condition may correspond to the case in which the distance between the electronic device 101 and the external electronic device 411 is farther than the second designated condition. For example, if the external electronic device 411 is relatively distant from the electronic device 101, the beam coverage area of the electronic device 101 needs to be extended up to the external electronic device 411 so that the link is not lost due to a movement of the external electronic device 411.

In operation 322, according to various embodiments, if the strength of the signal satisfies the third designated condition, the electronic device 101 may transmit data to the external electronic device 411 via the first communication module 403 and the second communication module 403, using a designated frequency corresponding to one of the first designated frequency and the second designated frequency. For example, if the strength of the signal satisfies the third designated condition, the electronic device 101 may perform calibration on the first designated frequency and the second designated frequency, and may transmit data to the external electronic device 411 using the one corresponding designated frequency. The electronic device 101 according to various embodiments may identify the position of the external electronic device 411 using both the first communication module 403 and the second communication module 405 as beam-forming devices, and may transmit data to the external electronic device 411, in order to increase the effective isotropically radiated power (EIRP) of an antenna. If the first communication module 403 and the second communication module 405 of the electronic device 101 according to various embodiments operate as a data transmission side, a gain of approximately 6 dB or more may be obtained in Tx using power combining and beam-forming technology. If they operate as a data reception side, a gain of approximately 3 dB or more may be obtained in Rx using maximal ratio combining (MRC) and beam-forming technology.

If the strength of the signal satisfies the third designated condition, the electronic device 101 according to various embodiments may transmit data using a designated frequency corresponding to one of the first designated frequency and the second designated frequency, and thus the electronic device 101 may perform longer distance data transmission to the external electronic device 411, than the case in which the electronic device 101 operates according to the first condition and the second condition.

The first communication module 403 and the second communication module 405 of the electronic device 101 according to various embodiments may perform data communication with the external electronic device 411 using millimeter waves (mmWave) in a band of approximately 60 GHz.

Although it is illustrated that whether the first designated condition is satisfied, whether the second designated condition is satisfied, and whether the third designated condition is satisfied are identified sequentially in the operation method described with reference to FIG. 3, this is merely an example, and the order of identifying whether the first designated condition is satisfied, whether the second designated condition is satisfied, and whether third designated condition is satisfied is not limited.

Figure 5A:
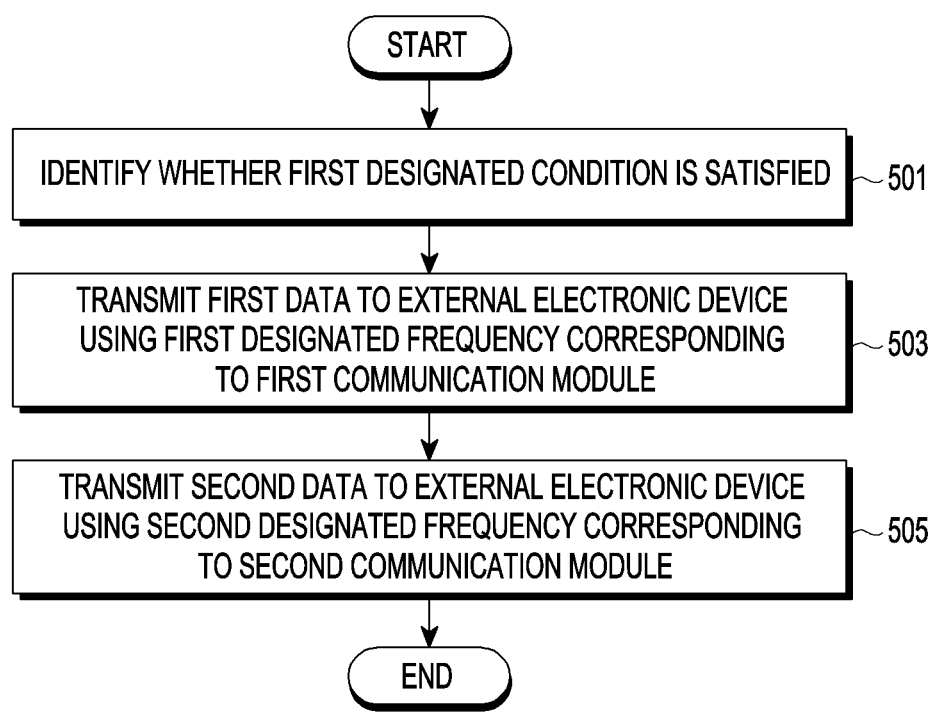
FIG. 5A is a flowchart illustrating an operation in which an electronic device transmits data to an external electronic device, if the strength of a signal satisfies a first designated condition according to various embodiments.
Figure 5B:
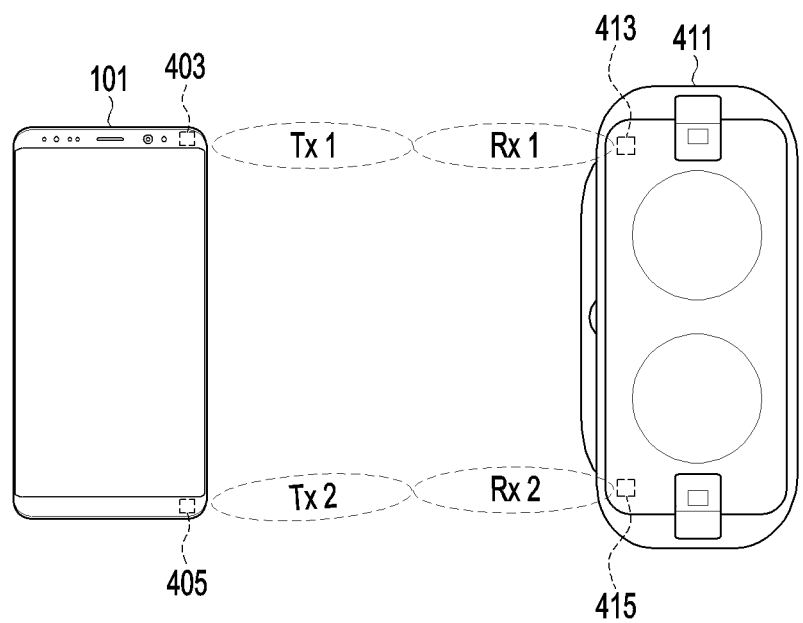
FIG. 5B is a diagram illustrating an example in which an electronic device transmits data to an external electronic device using a first communication module and a second communication module, if the strength of a signal satisfies a first designated condition according to various embodiments.

FIG. 5A is a flowchart illustrating an operation in which the electronic device 101 transmits data to the external electronic device 411, if the strength of a signal satisfies a first designated condition according to various embodiments. The embodiment of FIG. 5A will be described in detail with reference to FIG. 5B. FIG. 5B illustrates that the electronic device 101 transmits data to the external electronic device 411 using the first communication module 403 and the second communication module 405, if the strength of a signal satisfies the first designated condition according to various embodiments.

In operation 501, according to various embodiments, the electronic device 101 (e.g., the processor 120) may identify whether the strength of a signal received from the external electronic device 411 satisfies the first designated condition. The method of identifying whether the electronic device 101 satisfies the first designated condition according to various embodiments may use operation 312 of FIG. 3. For example, as illustrated in FIG. 5B, as the first designated condition, if the strength of a signal received via the first communication module 403 is greater than or equal to a first designated strength, or if the strength of a signal received via the second communication module 405 is greater than or equal to a second designated strength, the electronic device 101 may identify that the first designated condition is satisfied.

In operation 503, according to various embodiments, if the strength of the signal satisfies the first designated condition, the electronic device 101 may transmit first data among data, which are to be transmitted to the external electronic device 411, to the external electronic device 411 using a first designated frequency corresponding to the first communication module 403. For example, if the strength of the signal satisfies the first designated condition as illustrated in operation 312 of FIG. 3, the electronic device 101 may transmit the first data to the first communication module 413 of the external electronic device 411, using the first designated frequency corresponding to the first communication module 403.

In operation 505, according to various embodiments, if the strength of the signal satisfies the first designated condition, the electronic device 101 may transmit second data among the data, which are to be transmitted to the external electronic device 411, to the external electronic device 411 using a second designated frequency corresponding to the second communication module 405. For example, if the strength of the signal satisfies the first designated condition as illustrated in operation 312 of FIG. 3, the electronic device 101 may transmit the second data to the second communication module 415 of the external electronic device 411, using the second designated frequency corresponding to the second communication module 405.

Figure 6A:
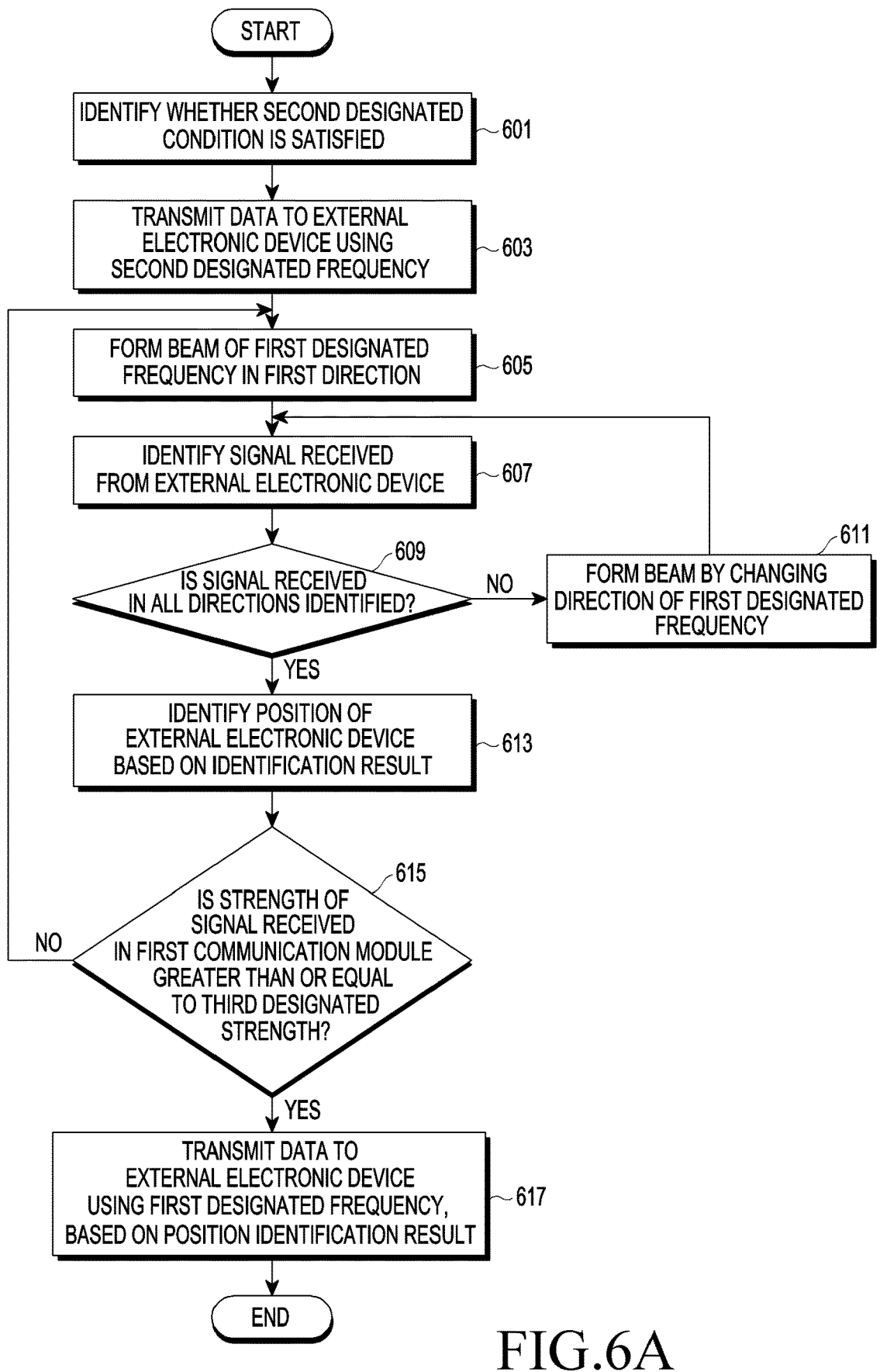
FIG. 6A is a flowchart illustrating an operation in which an electronic device transmits data to an external electronic device, if the strength of a signal satisfies a second designated condition according to various embodiments.
Figure 6B:
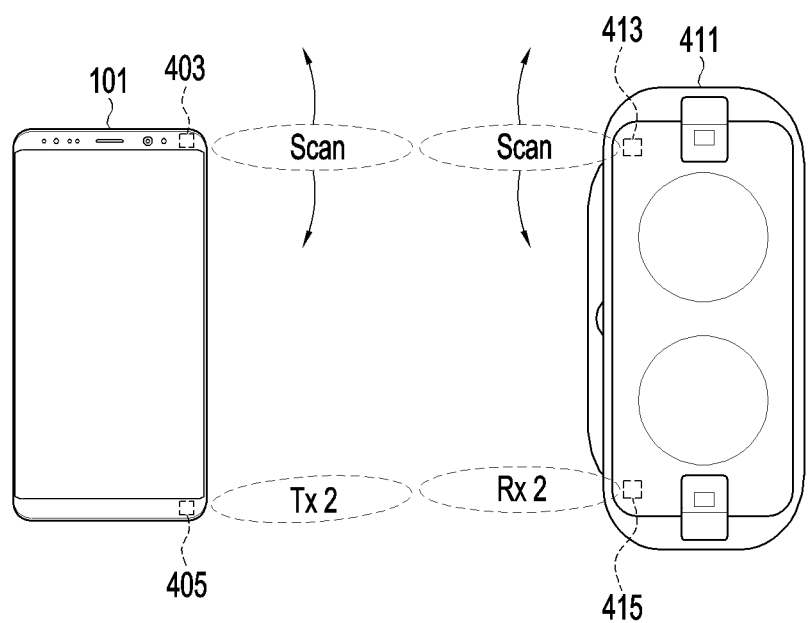
FIG. 6B is a diagram illustrating an example in which an electronic device identifies the position of an external electronic device using a first designated frequency, and transmits data to the external electronic device using a second designated frequency, if the strength of a signal satisfies a second designated condition according to various embodiments.

FIG. 6A is a flowchart illustrating an operation in which the electronic device 101 transmits data to the external electronic device 411, if the strength of a signal satisfies a second designated condition according to various embodiments. The embodiment of FIG. 6A will be described in detail with reference to FIG. 6B. FIG. 6B is a diagram illustrating an example in which the electronic device 101 identifies the position of the external electronic device 411 using a first designated frequency, and transmits data to the external electronic device 411 using a second designated frequency, if the strength of the signal satisfies the second designated condition according to various embodiments.

In operation 601, according to various embodiments, the electronic device 101 (e.g., the processor 120) may identify whether the strength of the signal received from the external electronic device 411 satisfies the second designated condition. The method of identifying whether the electronic device 101 satisfies the second designated condition according to various embodiments may use operation 316 of FIG. 3. For example, as illustrated in FIG. 6B, as the second designated condition, if the strength of a signal received via the first communication module 403 is less than a first designated strength, or if the strength of a signal received via the second communication module 405 is greater than or equal to a second designated strength, the electronic device 101 may identify that the second designated condition is satisfied.

In operation 603, according to various embodiments, if the strength of the signal satisfies the second designated condition, the electronic device 101 may identify the position of the external electronic device 411 in comparison with the electronic device 101, using the first designated frequency, and may transmit data to the external electronic device 411 using the second designated frequency based at least on the position. The method in which the electronic device 101 according to various embodiments identifies the position of the external electronic device 411, and transmits data to the external electronic device 411 may use operation 318 of FIG. 3. For example, as illustrated in FIG. 6B, if the second designated condition is satisfied, the electronic device 101 may identify the position of the external electronic device 411 in comparison with the electronic device 101 using the first designated frequency corresponding to the first communication module 403, and may transmit data to the second communication module 413 of the external electronic device 411 based at least on the position of the external electronic device 411 using the second designated frequency corresponding to the second communication module 405.

In the state in which the second designated condition is satisfied, while the electronic device 101 according to various embodiments transmits data to the external electronic device 411 using the second designated frequency, the electronic device 101 may compare the strength of a first signal received via the first communication module 403 with the strength of a second signal received via the second communication module 405. For example, as illustrated in FIG. 6B, while transmitting data to the external electronic device 411 using the second designated frequency corresponding to the second communication module 405 in the state in which the second designated condition is satisfied, the strength of the first signal received via the first communication module 403 and the strength of the second signal received via the second communication module 405 that performs data transmission may be compared.

If the strength of the first signal is greater than the strength of the second signal, the electronic device 101 according to various embodiments may transmit data based at least on the position of the external electronic device 411 by changing from the second designated frequency corresponding to the second communication module 405 to the first designated frequency corresponding to the first communication module 403.

In operation 605, according to various embodiments, the electronic device 101 may form a beam of the first designated frequency in a first direction, using the first communication module 403. The electronic device 101 according to various embodiments may transmit a transmission signal to the external electronic device 411 using the formed beam. For example, as illustrated in FIG. 6B, the electronic device 101 may form a beam of the first designated frequency in the first direction using the first communication module 403, and may transmit a transmission signal to the external electronic device 411 using the formed beam.

In operation 607, according to various embodiments, the electronic device 101 may identify a signal received from the external electronic device 411 in the first direction. For example, as illustrated in FIG. 6B, the electronic device 101 may receive a response signal from the external electronic device 411 in the first direction in response to the transmission signal, and may identify the received signal and the strength of the signal.

In operation 609, according to various embodiments, the electronic device 101 may identify whether a signal is received from the external electronic device 411 in all directions using the first designated frequency.

In operation 611, according to various embodiments, if the result of identification shows that the electronic device 101 does not receive a signal from the external electronic device 411 in all directions, the electronic device 101 may form a beam by changing the direction of the first designated frequency. The electronic device 101 according to various embodiments may perform beam-forming scanning using the first designated frequency via a phase shifter included in the first communication module 403. For example, as illustrated in FIG. 6B, the electronic device 101 may form a beam of the first designated frequency in a second direction that is changed from the first direction using the phase shifter of the first communication module 403, and may transmit a transmission signal to the external electronic device 411 using the formed beam. The electronic device 101 may receive a response signal from the external electronic device 411 in the second direction in response to the transmission signal, and may identify the received signal and the strength of the received signal. The electronic device 101 according to various embodiments may set the direction of a frequency, based on a previously stored beam-forming pattern book.

In operation 613, according to various embodiments, if the result of identifying signal reception shows that the electronic device 101 receives a signal from the external electronic device 411 in all directions, the electronic device 101 may identify the position of the external electronic device 411 based on the identification result. The method in which the electronic device 101 according to various embodiments identifies the position of the external electronic device 411 may use operation 318 of FIG. 3. The electronic device 101 according to various embodiments may compare the strength of a reception signal in each direction in which beam-forming scanning is performed, and may identify the position of the external electronic device 411 in comparison with the electronic device 101 in a direction in which a reception signal has the highest strength according to a result of the comparison. For example, as illustrated in FIG. 6B, the electronic device 101 may receive a signal from the external electronic device 411 in each direction by performing beam-forming scanning in the first direction, the second direction, and the third direction, using the first communication module 403. The electronic device 101 may compare the strength of a signal received in the first direction, the strength of a signal received in the second direction, and the strength of a signal received in the third direction, and may identify the position of the external electronic device 411 in comparison with the electronic device 101 in a direction in which a reception signal has the highest strength (e.g., in the third direction) according to a result of the comparison.

In operation 615, according to various embodiments, the electronic device 101 may identify whether the strength of a signal received via the first communication module 403 is greater than or equal to a third designated strength. The electronic device 101 according to various embodiments may identify whether the strength of a signal in a direction in which a reception signal has the highest strength is greater than or equal to the third designated strength. If a result of the identification shows that the strength of the signal in the direction in which the reception signal has the highest strength is less than the third designated strength, the electronic device 101 according to various embodiments may return to operation 605 and may perform beam-forming scanning related to the first designated frequency in each direction. The third designated strength according to various embodiments may be the same as, or may be different from, the first designated strength in operation 601.

In operation 617, according to various embodiments, if the result of the identification shows that the strength of the signal in the direction in which the reception signal has the highest strength is greater than or equal to the third designated strength, the electronic device 101 may transmit data using the first designated frequency corresponding to the first communication module 403, based at least on the identified position of the external electronic device 411.

While transmitting the data using the first designated frequency, the electronic device 101 may suspend transmitting data using the second designated frequency corresponding to the second communication module 405, and may perform beam-forming via the first communication module 403 using the second designated frequency as described with reference to operations 605 to 617. According to various embodiments, the electronic device 101 may form a beam of the second designated frequency corresponding to the second communication module 405, based on the result of identifying the position, and may use the beam for data transmission or reception.

Figure 7A:
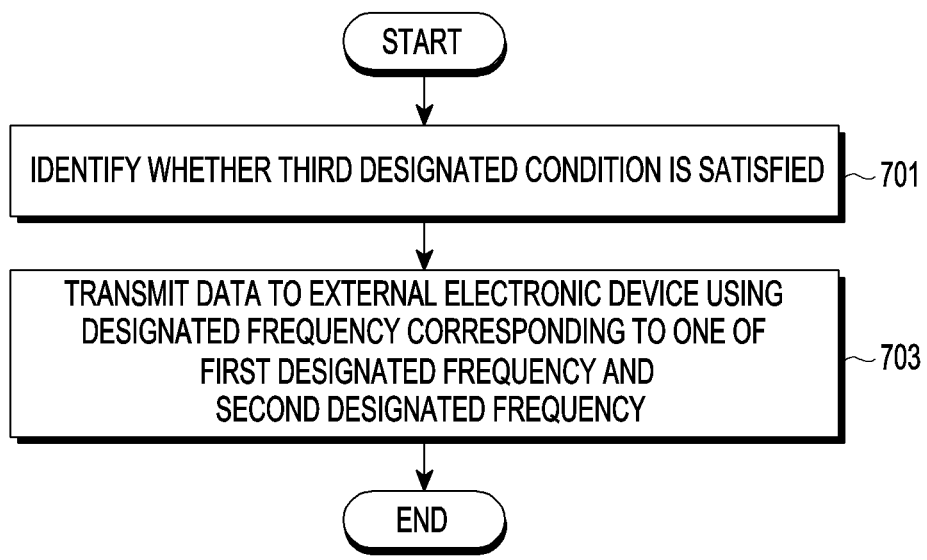
FIG. 7A is a flowchart illustrating an operation in which an electronic device transmits data to an external electronic device, if the strength of a signal satisfies a third designated condition according to various embodiments.
Figure 7B:
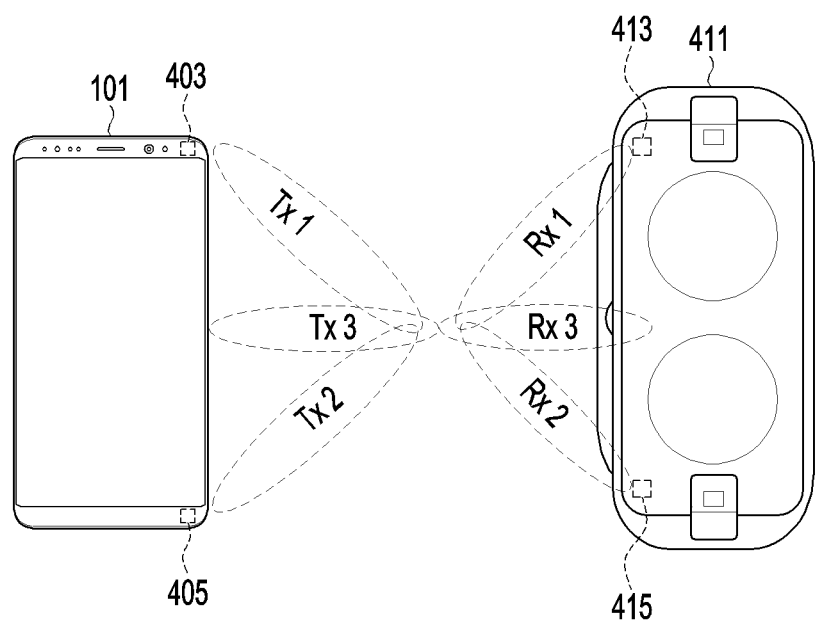
FIG. 7B is a diagram illustrating an example in which an electronic device transmits data to an external electronic device using a designated frequency corresponding to one of a first designated frequency and a second designated frequency, if the strength of a signal satisfies a third designated condition according to various embodiments.

FIG. 7A is a flowchart illustrating an operation in which the electronic device 101 transmits data to the external electronic device 411, if the strength of a signal satisfies a third designated condition according to various embodiments. The embodiment of FIG. 7A will be described in detail with reference to FIG. 7B. FIG. 7B is a diagram illustrating an example in which the electronic device 101 transmits data to the external electronic device 411 using a designated frequency corresponding to one of a first designated frequency and a second designated frequency, if the strength of a signal satisfies the third designated condition according to various embodiments.

In operation 701, according to various embodiments, the electronic device 101 may identify whether the strength of a signal satisfies the third designated condition. The method of identifying whether the electronic device 101 satisfies the third designated condition according to various embodiments may use operation 320 of FIG. 3. For example, as illustrated in FIG. 7B, as the third designated condition, if the strength of a signal received via the first communication module 403 is less than a first designated strength, or if the strength of a signal received via the second communication module 405 is less than a second designated strength, the electronic device 101 may identify that the third designated condition is satisfied.

In operation 703, according to various embodiments, if the strength of the signal satisfies the third designated condition, the electronic device 101 may transmit data to the external electronic device 411 via the first communication module 403 and the second communication module 403, using a designated frequency corresponding to one of the first designated frequency corresponding to the first communication module 403 and the second designated frequency corresponding to the second communication module 405. The method in which the electronic device 101 according to various embodiments transmits data to the external electronic device 411 via the first communication module 403 and the second communication module 405, using a designated frequency corresponding to one of the first designated frequency corresponding to the first communication module 403 and the second designated frequency corresponding to the second communication module 405 may use operation 322 of FIG. 3. For example, as illustrated in FIG. 7B, if the strength of the signal satisfies the third designated condition, the electronic device 101 may perform calibration on the first designated frequency corresponding to the first communication module 403 and the second designated frequency corresponding to the second communication module 405, and may transmit data to the external electronic device 411 using the one corresponding designated frequency.

Figure 8A:
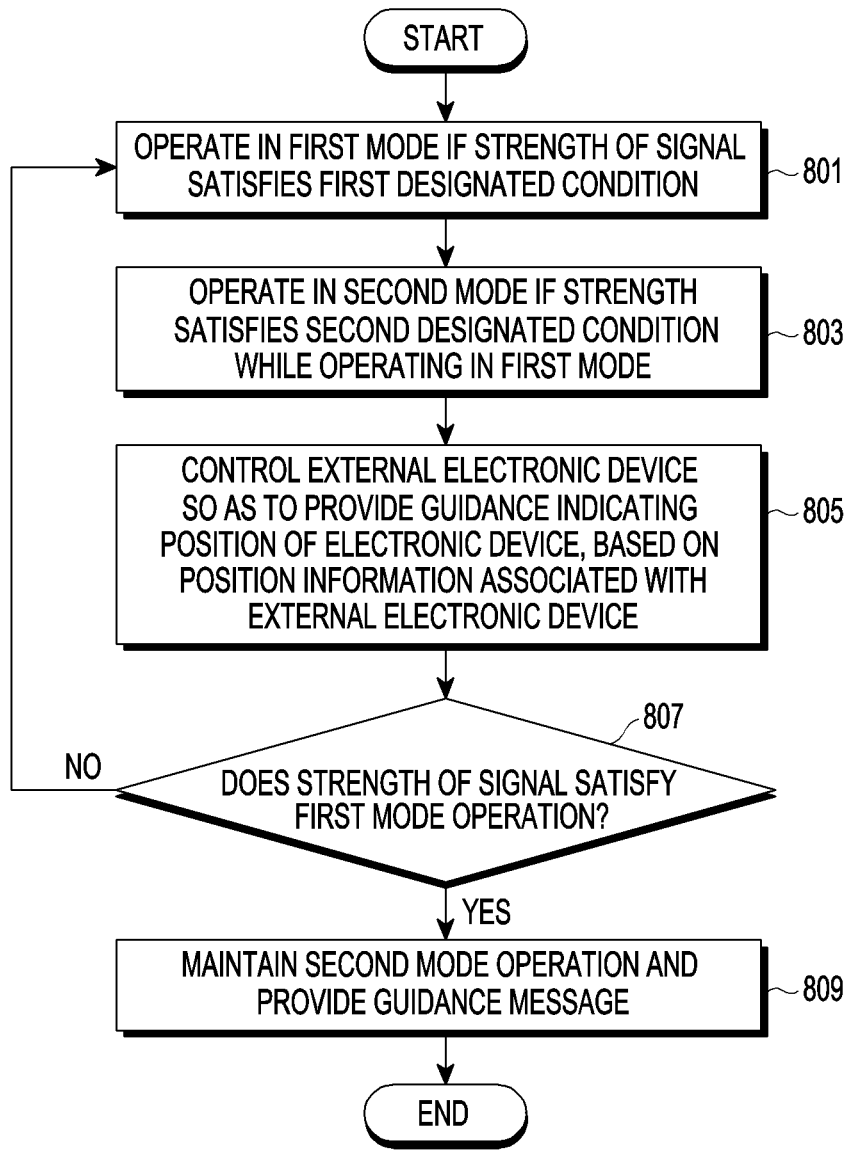
FIG. 8A is a flowchart illustrating an operation in which an electronic device provides a guidance indicating the position of the electronic device so that the electronic device in the state in which the strength of a signal satisfies a second designated condition enters the state in which a first designated condition is satisfied, according to various embodiments.
Figure 8B:
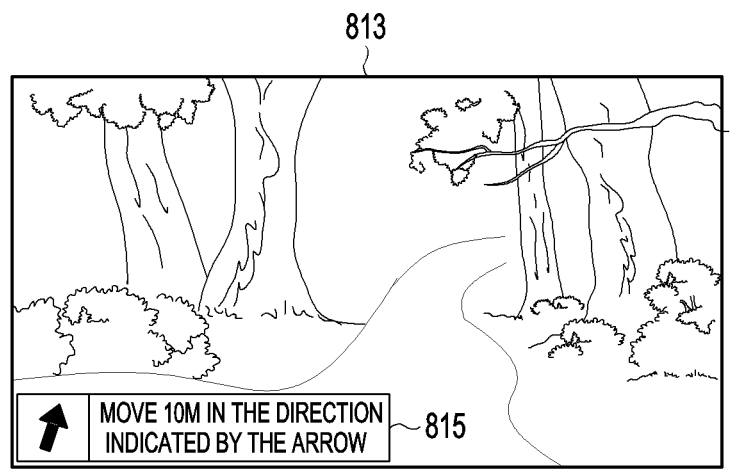
FIG. 8B is a diagram illustrating an example in which an external electronic device provides a guidance indicating the position of an electronic device according to various embodiments.

FIG. 8A is a flowchart illustrating an operation in which the electronic device 101 provides a guidance indicating the position of the electronic device 101 based at least on the position of the external electronic device 411, so that the electronic device 101 being in the state in which the strength of a signal satisfies a second designated condition enters the state in which the first designated condition is satisfied. The embodiment of FIG. 8A will be described in detail with reference to FIG. 8B. FIG. 8B is a diagram illustrating an example in which the electronic device 101 according to various embodiments transmits data associated with a guidance indicating the position of the electronic device 101 to the external electronic device 411, and the external electronic device 411 provides a guidance 815 indicating the position of the electronic device 101 via a display 813 (e.g., the display device 160 of FIG. 1) of the external electronic device 411, using the data associated with the guidance.

In operation 801, according to various embodiments, the electronic device 101 (e.g., the processor 120) may operate in a first mode, if the strength of a signal satisfies a first designated condition. For example, as illustrated in operations 312 and 314 of FIG. 3, if the strength of a signal satisfies the first designated condition, the electronic device 101 may transmit first data among data, which are to be transmitted to the external electronic device 411, to the external electronic device using a first designated frequency corresponding to the first communication module 403, and may transmit second data among the data to the external electronic device 411 using a second designated frequency corresponding to the second communication module 405.

In operation 803, according to various embodiments, if the electronic device 101 being in the state in which the strength of the signal satisfies the first designated condition enters the state in which the second designated condition is satisfied, the electronic device 101 may operate in a second mode. For example, as illustrated in operations 316 and 318 of FIG. 3, if the strength of the signal satisfies the second designated condition, the electronic device 101 may identify the position of the external electronic device 411 in comparison with the electronic device 101, using the first designated frequency, and may transmit data to the external electronic device 411 using the second designated frequency based at least on the position.

In operation 805, according to various embodiments, the electronic device 101 may identify the position of the external electronic device 411 using the first designated frequency, and may provide a guidance indicating the position of the electronic device 101 based at least on the position of the electronic device 101 or the position of the external electronic device 411, so that the distance between the electronic device 101 and the external electronic device 411 becomes narrow. The electronic device 101 according to various embodiments may identify the position of the external electronic device 411 using the first designated frequency, as illustrated in operation 318 of FIG. 3. The electronic device 101 according to various embodiments may calculate the difference between the position of the electronic device 101 and the position of the external electronic device 411, and may provide at least one of a voice guidance or a display guidance in order to decrease the difference in position. If the electronic device 101 interoperates with the external electronic device 411 in real time, and the content on a screen that is currently displayed on the display 160 of the electronic device 101 is the same as the content on a screen that is currently displayed on a display of the external electronic device 411, the electronic device 101 may transmit screen information providing the guidance to the external electronic device 411. For example, as illustrated in FIG. 8B, the electronic device 101 may transmit, to the external electronic device 411, screen information that provides a guidance, and the external electronic device 411 that receives the screen information may provide a guidance 815 (e.g., an arrow and a message) indicating the position of the electronic device 101 via the display 813 of the external electronic device 411 using the screen information.

The electronic device 101 according to various embodiments may transmit guidance information related to a guidance indicating the position of the electronic device 101 to the external electronic device 411, so that the external electronic device 411 provides a guidance indicating the position of the electronic device 101. The guidance information according to various embodiments may include at least one piece of information among the position information associated with the electronic device 101 and the position information associated with the external electronic device 411. The guidance information according to various embodiments may include a guidance indicating the position of the electronic device 101, the guidance being generated based on the position information associated with the electronic device 101 and the position information associated with the external electronic device 411. For example, as illustrated in FIG. 8B, the electronic device 101 may transmit guidance information to the external electronic device 411, and the external electronic device 411 that receives the guidance information may provide the guidance 815 (e.g., an arrow and a message) indicating the position of the electronic device 101 via the display 813 of the external electronic device 411 using the guidance information. For example, as illustrated in FIG. 8B, the electronic device 101 may transmit guidance information to the external electronic device 411, and the external electronic device 411 that receives the guidance information may provide the guidance 815 (e.g., an arrow and a message) indicating the position of the electronic device 101 via the display 813 of the external electronic device 411 using the guidance information.

Figure 9:
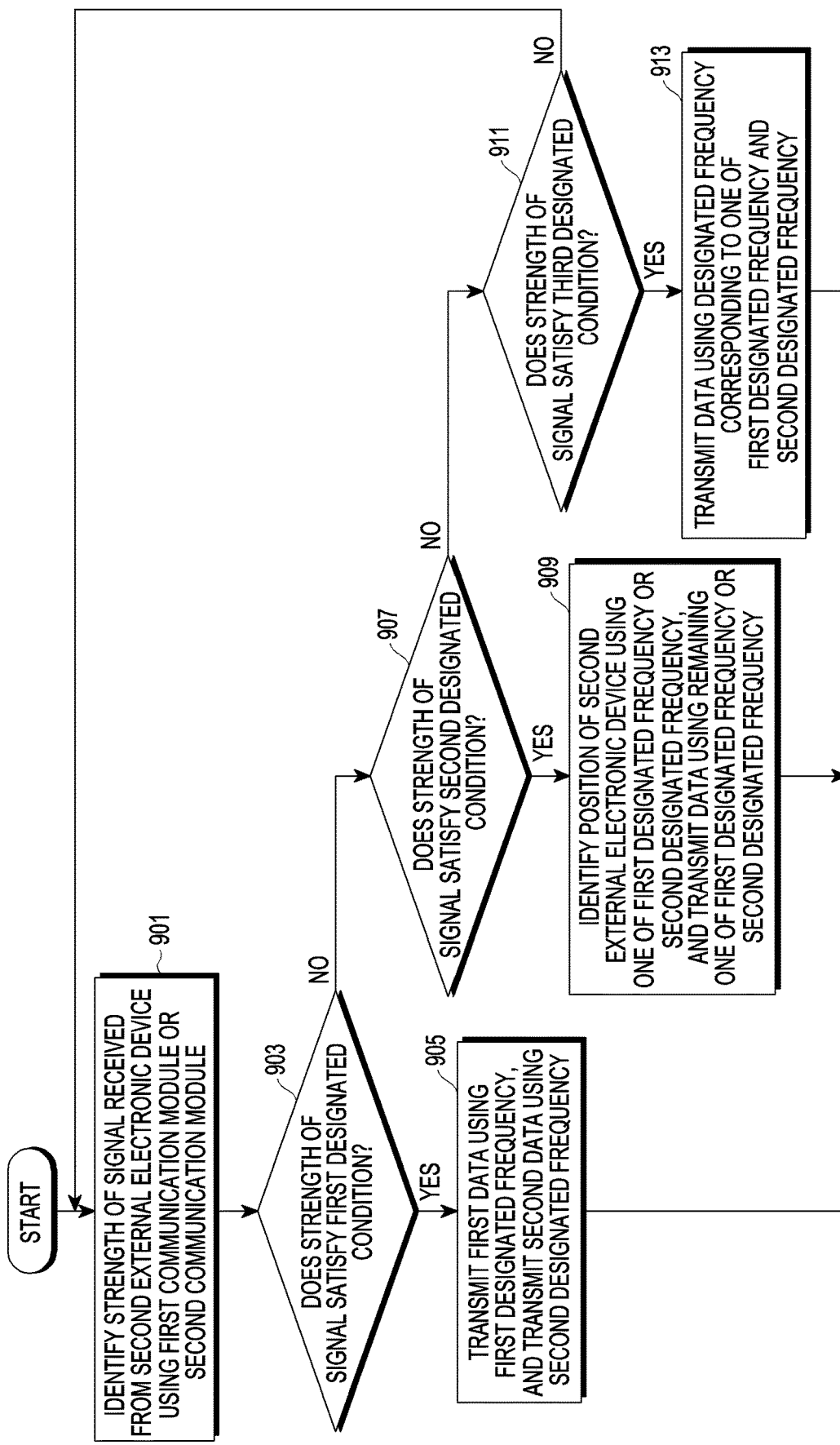
FIG. 9 is a flowchart illustrating an operation in which an electronic device and a first external electronic device change a data communication environment, according to various embodiments.
Figure 10A:
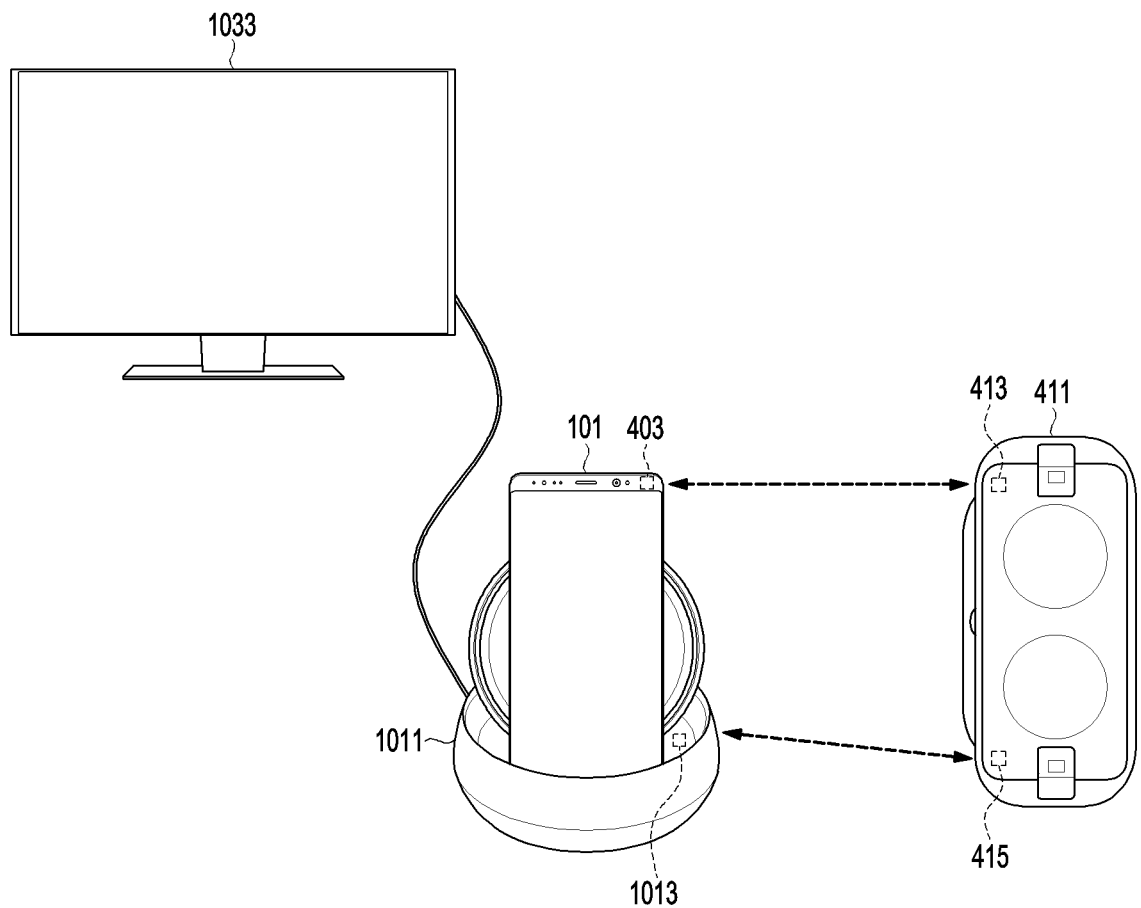
FIG. 10A is a diagram illustrating an example in which an electronic device and a first external electronic device transmit data to a second external electronic device, according to various embodiments.

FIG. 9 is a flowchart illustrating an operation in which the electronic device 101 and a first external electronic device 1011 change a data communication environment, according to various embodiments. The embodiment of FIG. 9 will be described in detail with reference to FIGS. 10A and 10B. FIG. 10A is a diagram illustrating an example in which the electronic device 101 and the first external electronic device 1011 transmit data to the second external electronic device 411 according to various embodiments. FIG. 10B is a diagram illustrating a beam coverage area of the first communication module 403 of the electronic device 101 and a beam coverage area of the second communication module 1013 of the first external electronic device 1011 according to various embodiments.

In operation 901, in the state in which the electronic device 101 (e.g., the processor 120) is connected, via an interface circuit (e.g., the interface 177), to the first external electronic device 1011 that includes the second communication module 1013 (e.g., the communication module 212) capable of performing communication according to a designated scheme, the electronic device 101 may identify the strength of a signal received from the second external electronic device 411 using the first communication module 403 included in the electronic device 101 or the second communication module 1013 included in the first external electronic device 1011. For example, as illustrated in FIG. 10A, the electronic device 101 may identify the strength of a signal received from the second external electronic device 411 using the first communication module 403 and the second communication module 1013 included in the first external electronic device 1011. The interface 177 according to various embodiments may include a universal serial bus (USB), a display port (DP), and a pci express (PCIe).

The first communication module 403 included in the electronic device 101 and the second communication module included in the first external electronic device 1011 according to various embodiments may be disposed to be spaced from each other so as to maximally widen the beam coverage area of an antenna. For example, as illustrated in FIG. 10B, the first communication module 403 and the second communication module 1013 included in the first external electronic device 1011 may be disposed to be spaced from each other, so that a first beam coverage area 1041 of the first communication module 403 included in the electronic device 101 partially overlaps a second beam coverage area 1042 of the second communication module 1013 included in the first external electronic device 1011.

The electronic device 101 according to various embodiments may identify the transmission strength of a signal transmitted to the second external electronic device 411, using the first communication module 403 or the second communication module 1013 included in the first external electronic device 1011. The method of identifying the strength of a signal received from the second external electronic device 411 or the method of identifying the transmission strength of another signal transmitted to the second external electronic device 411 using the first communication module 403 of the electronic device 101 or the second communication module 1013 of the first external electronic device 1011 according to various embodiments may use the method of operation 310 of FIG. 3.

In operation 903, according to various embodiments, the electronic device 101 or the first external electronic device 1011 may identify whether the strength of a signal received from the second external electronic device 411 satisfies a first designated condition. The electronic device 101 according to various embodiments may identify whether the strength of a signal received from the second external electronic device 411 and the transmission strength of another signal transmitted to the second external electronic device 411 satisfy the first designated condition.

The method of identifying whether the strength of a signal satisfies the first designated condition using the first communication module 403 and the second communication module 1013 included in the first external electronic device 1011, according to various embodiments, may use operation 312 of FIG. 3.

In operation 905, according to various embodiments, if the strength of a signal received from the second external electronic device 411 satisfies the first designated condition, the electronic device 101 may transmit first data among data, which are to be transmitted to the second external electronic device 411, to the second external electronic device 411 using a first designated frequency corresponding to the first communication module 403, and may transmit second data among the data to the second external electronic device 411 using a second designated frequency corresponding to the second communication module 1013 of the first external electronic device 1011. The electronic device 101 according to various embodiments may transmit data associated with a screen that is currently displayed on the display 160 of the electronic device 101, to the first external electronic device 101 using the interface 177, and the first external electronic device 1011 may transmit the data to a third external electronic device 1033 connected in a wired or wireless manner. For example, as illustrated in FIG. 10A, the electronic device 101 may transmit data associated with a screen that is currently displayed on the display 160 of the electronic device 101, to the first external electronic device 101 using the interface 177, and the first external electronic device 1011 may transmit the data to the third external electronic device 1033 connected in a wired or wireless manner.

In operation 907, according to various embodiments, the electronic device 101 may identify whether the strength of a signal received from the second external electronic device 411 satisfies a second designated condition. The electronic device 101 according to various embodiments may identify whether the strength of a signal received from the second external electronic device 411 and the transmission strength of another signal transmitted to the second external electronic device 411 satisfy the second designated condition. The method of identifying whether the strength of a signal satisfies the second designated condition using the first communication module 403 and the second communication module 1013 included in the first external electronic device 1011, according to various embodiments, may use operation 316 of FIG. 3.

In operation 909, according to various embodiments, if the strength of a signal satisfies the second designated condition, the electronic device 101 may identify the position of the second external electronic device 411 in comparison with the electronic device, using one of the first designated frequency or the second designated frequency, and may transmit data to the second external electronic device 411 based at least on the position using the other one of the first designated frequency or the second designated frequency. The method of identifying the position of the second external electronic device 411 using one of the first designated frequency corresponding to the first communication module 403 or the second designated frequency corresponding to the second communication module 1013 included in the first external electronic device 1011, and the method of transmitting data to the second external electronic device 411 using the other one of the first designated frequency corresponding to the first communication module 403 or the second designated frequency corresponding to the second communication module 1013 included in the first external electronic device 1011, according to various embodiments, may use operation 318 of FIG. 3 and operations 601 to 617 of FIG. 6A.

In operation 911, according to various embodiments, the electronic device 101 may identify whether the strength of a signal received from the second external electronic device 411 satisfies a third designated condition. The electronic device 101 according to various embodiments may identify whether the strength of a signal received from the second external electronic device 411 and the transmission strength of another signal transmitted to the second external electronic device 411 satisfy the third designated condition. The method of identifying whether the strength of a signal satisfies the third designated condition using the first communication module 403 and the second communication module 1013 included in the first external electronic device 1011, according to various embodiments, may use operation 320 of FIG. 3.

In operation 913, according to various embodiments, if the strength of a signal satisfies the third designated condition, the electronic device 101 may transmit data to an external electronic device via the first communication module 403 and the second communication module 1013 included in the first external electronic device 1011, using a designated frequency corresponding to one of the first designated frequency and the second designated frequency. The method in which the electronic device 101 according to various embodiments transmits data to the second external electronic device 411 via the first communication module 403 and the second communication module 1013 included in the first external electronic device 1011, using a designated frequency corresponding to one of the first designated frequency and the second designated frequency corresponding to the second communication module 1013 included in the first external electronic device 1011, may use operation 322 of FIG. 3. The first communication module 403 of the electronic device 101 and the second communication module 1013 of the first external electronic device 1011 according to various embodiments may perform data communication with the second external electronic device 411 using millimeter waves (mmWave) in a band of approximately 60 GHz.

Figure 11:
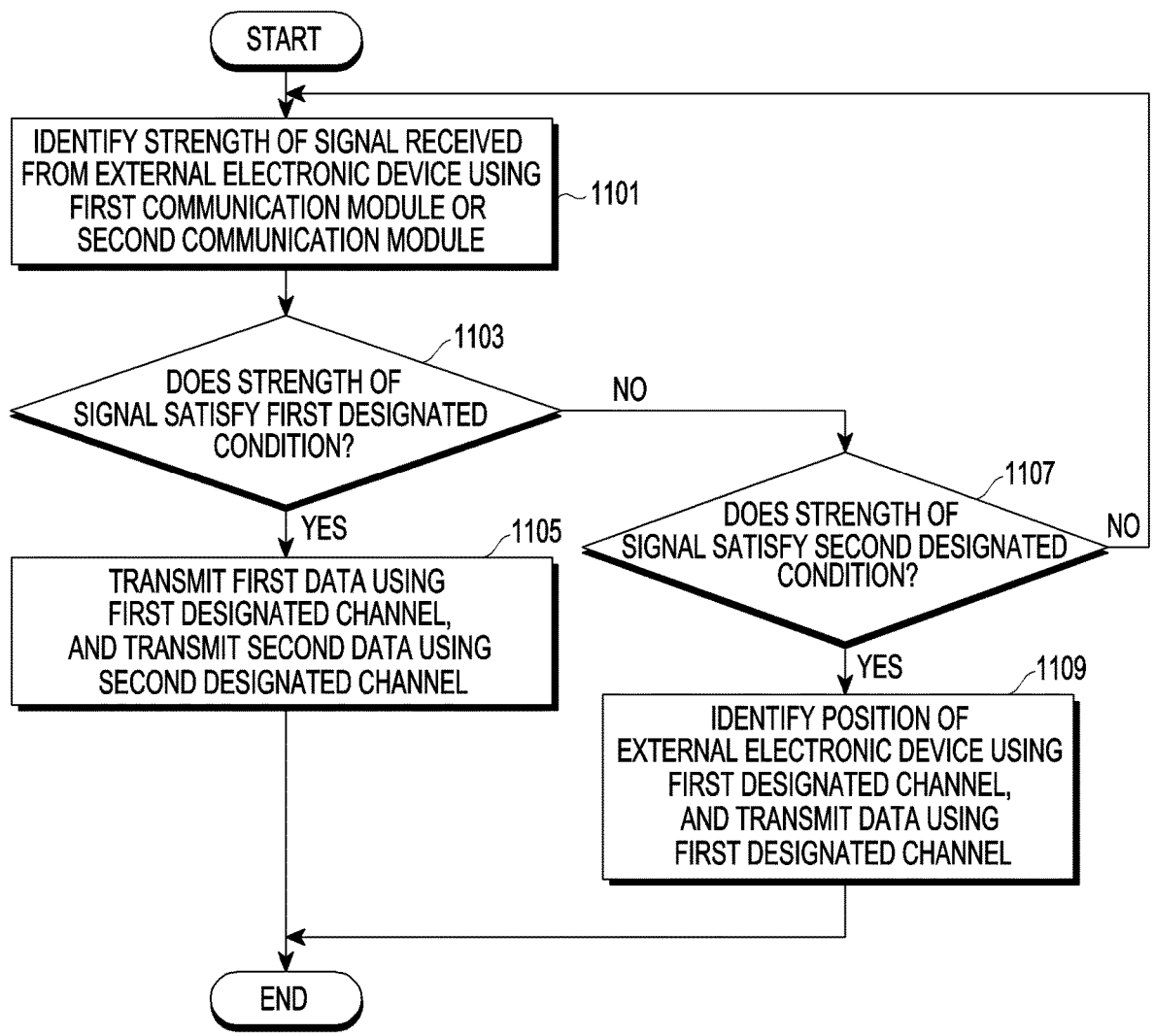
FIG. 11 is a flowchart illustrating an operation in which an electronic device changes a data communication environment according to various embodiments.
Figure 12:
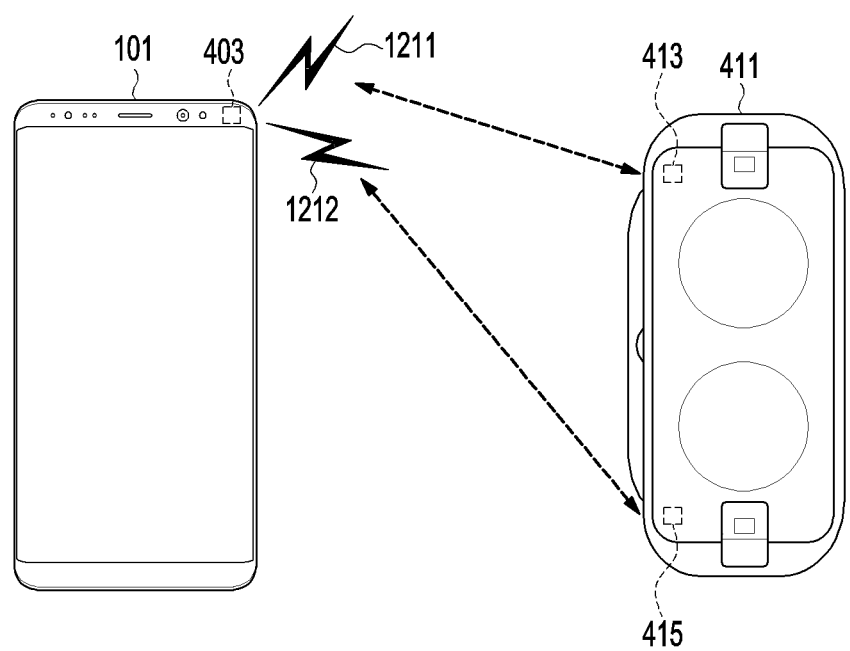
FIG. 12 is a diagram illustrating an example in which an electronic device including a single communication module transmits data to an external electronic device, according to various embodiments.

FIG. 11 is a flowchart illustrating an operation in which an electronic device changes a data communication environment according to various embodiments. The embodiment of FIG. 11 will be described in detail with reference to FIG. 12. FIG. 12 is a diagram illustrating an example in which an electronic device including the single communication module 403 transmits data to the external electronic device 411 according to various embodiments. The electronic device 101 according to various embodiments may include the communication module 403 (e.g., the communication module 211) capable of performing communication with the external electronic device 411, using a first designated channel 1211 and a second designated channel 1212.

In operation 1101, according to various embodiments, the electronic device 101 (e.g., the processor 120) may identify the strength of a signal received from the external electronic device 411 using the first designated channel 1211 or the second designated channel 1212. For example, as illustrated in FIG. 12, the electronic device 101 may identify the strength of a signal received in the single communication module 403 (e.g., the communication module 211 of FIG. 2) using the first designated channel 1211 or the second designated channel 1212, from the external electronic device 411. The electronic device 101 according to various embodiments may measure the received signal strength indication (RSSI) value of a signal received from the external electronic device 411 using the first designated channel 1211 or the second designated channel 1212, so as to identify the strength of the received signal. The electronic device 101 according to various embodiments may identify the transmission strength of another signal that the electronic device 101 transmits to the external electronic device 411 using the first designated channel 1211 or the second designated channel 1212. For example, the electronic device 101 may identify the transmitter signal strength indicator (TSSI) value of a transmission signal transmitted to the external electronic device 411 using the first designated channel 1211 or the second designated channel 1212, so as to identify the transmission strength of the transmission signal In operation 1103, according to various embodiments, the electronic device 101 may identify whether the strength of a signal satisfies a first designated condition. For example, as the first designated condition, if the strength of a signal received via the first designated channel 1211 is greater than or equal to a first designated strength, or if the strength of a signal received via the second designated channel 1212 is greater than or equal to a second designated strength, the electronic device 101 may identify that the first designated condition is satisfied. The electronic device 101 according to various embodiments may identify whether the first designated condition is satisfied, based on the strength of a signal received from the external electronic device 411 and the transmission strength of another signal transmitted to the external electronic device 411. The method of identifying whether the electronic device 101 satisfies the first designated condition according to various embodiments may use operation 312 of FIG. 3.

In operation 1105, according to various embodiments, if the strength of the signal received from the external electronic device 411 satisfies the first designated condition, the electronic device 101 may transmit first data among data, which are to be transmitted to the external electronic device 411, to the external electronic device 411 using the first designated channel 1211 corresponding to the first communication module 403, and may transmit second data among the data to the external electronic device 411 using the second designated channel 1212 corresponding to the first communication module 403.

In operation 1107, according to various embodiments, the electronic device 101 may identify whether the strength of the signal satisfies a second designated condition. For example, as the second designated condition, if the strength of a signal received via the first designated channel 1211 is less than the first designated strength, or if the strength of a signal received via the second designated channel 1212 is greater than or equal to the second designated strength, the electronic device 101 may identify that the second designated condition is satisfied. The electronic device 101 according to various embodiments may identify whether the second designated condition is satisfied, based on the strength of a signal received from the external electronic device 411 and the transmission strength of another signal transmitted to the external electronic device 411. The method of identifying whether the electronic device 101 satisfies the second designated condition according to various embodiments may use operation 316 of FIG. 3.

In operation 1109, according to various embodiments, if the second designated condition is satisfied, the electronic device 101 may identify the position of the external electronic device in comparison with the electronic device 101 using the first designated channel 1211, and may transmit the data to the external electronic device using the second designated channel 1212, based at least on the position. If the strength satisfies the second designated condition, the electronic device 101 according to various embodiments may identify the position of the external electronic device 411 via beam-forming scanning using the first designated channel 1211. The method of identifying the position of the external electronic device using the first designated channel corresponding to the first communication module 403 and the method of transmitting data to the external electronic device using the second designated channel corresponding to the first communication module 403 according to various embodiments may use operation 318 of FIG. 3 and operations 601 to 617 of FIG. 6A.

If the second designated condition is satisfied, the electronic device 101 according to various embodiments may provide a guidance related to the position of the electronic device 101. For example, if the electronic device 101 being in the state in which the strength of a signal satisfies the first designated condition enters the state in which the second designated condition is satisfied, the electronic device 101 may operate in a second mode. The electronic device 101 may identify the position of the external electronic device 411 using the first designated channel 1211, and may provide a guidance indicating the position of the electronic device 101 based at least on the position of the electronic device 101 or the position of the external electronic device 411, so that the distance between the electronic device 101 and the external electronic device 411 becomes narrow. The method of providing a guidance may use operations 801 to 809 of FIG. 8A.

If the strength of a signal satisfies the second designated condition, the electronic device 101 according to various embodiments may compare the strength of a first signal received via the first designated channel 1211 with the strength of a second signal received via the second designated channel 1212 while the electronic device 101 transmits the data to the external electronic device 411 using the second designated channel 1212, and if the strength of the first signal is greater than the strength of the second signal, the electronic device 101 may transmit the data based at least on the position by changing from the second designated channel 1212 to the first designated channel 1211. The method of transmitting the data by changing from the second designated channel 1212 to the first designated channel 1211 may use operations 601 to 617 of FIG. 6A.

The first designated channel 1211 and the second designated channel 1212 according to various embodiments may communicate with the external electronic device 411 using millimeter waves (mmWave) in a band of approximately 60 GHz.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments an electronic device (e.g., the electronic device 101) may include a first communication module (e.g., the first communication module 211), a second communication module (e.g., the second communication module 212), and a processor (e.g., the processor 120), wherein the processor (e.g., the processor 120) may be configured to: identify the strength of a signal received from an external electronic device using the first communication module or the second communication module; if the strength satisfies a first designated condition, transmit first data among data, which are to be transmitted to the external electronic device, to the external electronic device using a first designated frequency corresponding to the first communication module, and transmit second data among the data to the external electronic device using a second designated frequency corresponding to the second communication module; if the strength satisfies a second designated condition, identify the position of the external electronic device in comparison with the electronic device, using the first designated frequency, and transmit the data to the external electronic device based at least on the position using the second designated frequency; and if the strength satisfies a third designated condition, transmit the data to the external electronic device via the first communication module and the second communication module, using a designated frequency corresponding to one of the first designated frequency and the second designated frequency.

According to various embodiments the processor (e.g., the processor 120) may be further configured to: identify the transmission strength of another signal transmitted to the external electronic device using the first communication module or the second communication module; and identify whether one of the first designated condition, the second designated condition, or the third designated condition is satisfied, based on the strength of the signal received from the external electronic device and the transmission strength of the another signal transmitted to the external electronic device.

According to various embodiments, the processor (e.g., the processor 120) may be configured to identify that the first designated condition is satisfied if the strength of a signal received via the first communication module is greater than or equal to a first designated strength or if the strength of a signal received via the second communication module is greater than or equal to a second designated strength. According to various embodiments, the processor (e.g., the processor 120) may be configured to identify the position of the external electronic device via beamforming scanning using the first frequency corresponding to the first communication module, if the strength satisfies the second designated condition.

According to various embodiments, the processor (e.g., the processor 120) may be configured to identify that the second designated condition is satisfied, if the strength of a signal received via the first communication module is less than a first designated strength or if the strength of a signal received via the second communication module is greater than or equal to a second designated strength.

According to various embodiments, the processor (e.g., the processor 120) may be configured to provide a guidance related to the position of the electronic device, based at least on the position of the external electronic device, if the strength satisfies the second designated condition.

According to various embodiments, the processor (e.g., the processor 120) may be configured to: compare the strength of a first signal received via the first communication module with the strength of a second signal received via the second communication module, while the data is transmitted to the external electronic device using the second designated frequency, if the strength satisfies the second designated condition; and transmit the data based at least on the position by changing from the second designated frequency corresponding to the second communication module to the first designated frequency corresponding to the first communication module, if the strength of the first signal is greater than the strength of the second signal.

According to various embodiments, the processor (e.g., the processor 120) may be configured to identify that the third designated condition is satisfied, if the strength of a signal received via the first communication module is less than a first designated strength, or if the strength of a signal received via the second communication module is less than a second designated strength.

According to various embodiments, the first communication module and the second communication module may be configured to communicate with the external electronic device using millimeter waves (mmWave) in a 60 GHz band.

According to various embodiments, an operation method of an electronic device that performs data communication may include: identifying the strength of a signal received from an external electronic device using a first communication module or a second communication module; if the strength satisfies a first designated condition, transmitting first data among data, which are to be transmitted to the external electronic device, to the external electronic device using a first designated frequency corresponding to the first communication module, and transmitting second data among the data to the external electronic device using a second designated frequency corresponding to the second communication module; if the strength satisfies a second designated condition, identifying the position of the external electronic device in comparison with the electronic device, using the first designated frequency, and transmitting the data to the external electronic device based at least on the position using the second designated frequency; and if the strength satisfies a third designated condition, transmitting the data to the external electronic device via the first communication module and the second communication module, using a designated frequency corresponding to one of the first designated frequency and the second designated frequency.

According to various embodiments, the electronic device 101 may include a communication module (e.g., the communication module 190) configured to communicate with an external electronic device using a first designated channel and a second designated channel, and a processor (e.g., the processor 120), wherein the processor (e.g., the processor 120) may be configured to: identify the strength of a signal received from the external electronic device using the first designated channel or the second designated channel; if the strength satisfies a first designated condition, transmit first data among data, which are to be transmitted to the external electronic device, to the external electronic device using the first designated channel, and transmit second data among the data to the external electronic device using the second designated channel; and if the strength satisfies a second designated condition, identify the position of the external electronic device in comparison with the electronic device, using the first designated channel, and transmit the data to the external electronic device based at least on the position using the second designated channel.

According to various embodiments, the processor may be configured to identify a transmission strength of another signal transmitted from the electronic device to the external electronic device using the first designated channel or the second designated channel; and identify whether one of the first designated condition or the second designated condition is satisfied, based on the strength of the signal received from the external electronic device and the transmission strength of the another signal transmitted to the external electronic device.

According to various embodiments, the processor may be configured to identify that the first designated condition is satisfied, if the strength of a signal received via the first designated channel is greater than or equal to a first designated strength or the strength of a signal received via the second designated channel is greater than or equal to a second designated strength.

According to various embodiments, the processor may be configured to identify the position of the external electronic device via beamforming scanning using the first designated channel, if the strength satisfies the second designated condition. According to various embodiments, the processor may be configured to identify that the second designated condition is satisfied, if the strength of a signal received via the first designated channel is less than a first designated strength, or the strength of a signal received via the second communication module is greater than or equal to a second designated strength. According to various embodiments, the processor may be configured to provide a guidance related to the position of the electronic device, based at least on the position of the external electronic device, if the strength satisfies the second designated condition.

According to various embodiments, the processor may be configured to compare the strength of a first signal received via the first designated channel with the strength of a second signal received via the second designated channel, while transmitting the data to the external electronic device using the second designated channel, if the strength satisfies the second designated condition, and if the strength of the first signal is greater than the strength of the second signal, the processor may be configured to transmit the data based at least on the position by changing from the second designated channel to the first designated channel. According to various embodiments, the first designated channel and the second designated channel may perform communication with the external electronic device using millimeter waves (mm-Wave) in a 60 GHz-band.

According to various embodiments, the electronic device 101 may include a first communication module capable of performing communication according to a designated scheme, an interface circuit (e.g., the interface 177), and a processor (e.g., the processor 120. The processor (e.g., the processor 120) may be configured to: identify the strength of a signal received from a second external electronic device using the first communication module or a second communication module in the state in which the processor (e.g., the processor 120) is connected, via the interface, to a first external electronic device that includes the second communication module capable of performing communication according to the designated scheme; if the strength satisfies a first designated condition, transmit first data among data, which are to be transmitted to the second external electronic device, to the second external electronic device using a first designated frequency corresponding to the first communication module; and transmit second data among the data to the second external electronic device using a second designated frequency corresponding to the second communication module. Also, the processor may be configured to: identify the position of the second external electronic device in comparison with the electronic device using one of the first designated frequency or the second designated frequency, if the strength satisfies the second designated condition; transmit the data to the second external electronic device based at least on the position using the other one of the first designated frequency or the second designated frequency; and transmit the data to the second external electronic device via the first communication module and the second communication module, using a designated frequency corresponding to one of the first designated frequency and the second designated frequency, if the strength satisfies a third designated condition.

According to various embodiments, the processor may be configured to transmit at least a part of the data to the first external electronic device, via the interface circuit.

According to various embodiments, the processor may be configured to: identify the transmission strength of another signal transmitted to the second external electronic device using the first communication module or the second communication module; and identify whether one of the first designated condition, the second designated condition, or the third designated condition is satisfied, based on the strength of a signal received from the second external electronic device and the transmission strength of the other signal transmitted to the second external electronic device.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first communication module;
a second communication module; and
a processor,
wherein the processor is configured to:
identify a strength of a signal received from an external electronic device using the first communication module or the second communication module;
if the strength satisfies a first designated condition, transmit first data among data, which are to be transmitted to the external electronic device, to the external electronic device using a first designated frequency corresponding to the first communication module, and transmit second data among the data to the external electronic device using a second designated frequency corresponding to the second communication module;
if the strength satisfies a second designated condition, identify a position of the external electronic device in comparison with the electronic device, using the first designated frequency, and transmit the data to the external electronic device based at least on the position using the second designated frequency; and
if the strength satisfies a third designated condition, transmit the data to the external electronic device via the first communication module and the second communication module, using a designated frequency corresponding to one of the first designated frequency and the second designated frequency.

2. The electronic device of claim 1, wherein the processor is further configured to:
identify a transmission strength of another signal transmitted to the external electronic device using the first communication module or the second communication module; and
identify whether one of the first designated condition, the second designated condition, or the third designated condition is satisfied, based on the strength of the signal received from the external electronic device and the transmission strength of the another signal transmitted to the external electronic device.

3. The electronic device of claim 1, wherein the processor is configured to identify that the first designated condition is satisfied if a strength of a signal received via the first communication module is greater than or equal to a first designated strength or if a strength of a signal received via the second communication module is greater than or equal to a second designated strength.

4. The electronic device of claim 1, wherein the processor is configured to identify the position of the external electronic device via beamforming scanning using the designated first frequency corresponding to the first communication module, if the strength satisfies the second designated condition.

5. The electronic device of claim 1, wherein the processor is configured to identify that the second designated condition is satisfied, if a strength of a signal received via the first communication module is less than a first designated strength or if a strength of a signal received via the second communication module is greater than or equal to a second designated strength.

6. The electronic device of claim 1, wherein the processor is configured to provide a guidance related to a position of the electronic device, based at least on the position of the external electronic device, if the strength satisfies the second designated condition.

7. The electronic device of claim 1, wherein the processor is configured to:
if the strength satisfies the second designated condition, compare a strength of a first signal received via the first communication module with a strength of a second signal received via the second communication module, while the data is transmitted to the external electronic device using the second designated frequency; and
if the strength of the first signal is greater than the strength of the second signal, transmit the data, based at least on the position, by changing from the second designated frequency corresponding to the second communication module to the first designated frequency corresponding to the first communication module.

8. The electronic device of claim 1, wherein the processor is configured to identify that the third designated condition is satisfied, if a strength of a signal received via the first communication module is less than a first designated strength, or if a strength of a signal received via the second communication module is less than a second designated strength.

9. The electronic device of claim 1, wherein the first communication module and the second communication module are configured to communicate with the external electronic device using millimeter waves (mmWave) in a 60 GHz band.

10. An electronic device comprising:
a communication module configured to communicate with an external electronic device using a first designated channel and a second designated channel; and
a processor,
wherein the processor is configured to:
identify a strength of a signal received from the external electronic device using the first designated channel or the second designated channel;
if the strength satisfies a first designated condition, transmit first data among data, which are to be transmitted to the external electronic device, to the external electronic device using the first designated channel, and transmit second data among the data to the external electronic device using the second designated channel; and
if the strength satisfies a second designated condition, identify a position of the external electronic device in comparison with the electronic device, using the first designated channel, and transmit the data to the external electronic device based at least on the position using the second designated channel.

11. The electronic device of claim 10, wherein the processor is configured to:
identify a transmission strength of another signal transmitted to the external electronic device using the first designated channel or the second designated channel; and
identify whether one of the first designated condition or the second designated condition is satisfied, based on the strength of the signal received from the external electronic device and the transmission strength of the another signal transmitted to the external electronic device.

12. The electronic device of claim 10, wherein the processor is configured to identify that the first designated condition is satisfied, if a strength of a signal received via the first designated channel is greater than or equal to a first designated strength or a strength of a signal received via the second designated channel is greater than or equal to a second designated strength.

13. The electronic device of claim 10, wherein the processor is configured to identify the position of the external electronic device via beamforming scanning using the first designated channel, if the strength satisfies the second designated condition.

14. The electronic device of claim 10, wherein the processor is configured to identify that the second designated condition is satisfied, if a strength of a signal received via the first designated channel is less than a first designated strength, or a strength of a signal received via the second communication module is greater than or equal to a second designated strength.

15. The electronic device of claim 10, wherein the processor is configured to provide a guidance related to a position of the electronic device, based at least on the position of the external electronic device, if the strength satisfies the second designated condition.

\* \* \* \* \*